United States Patent
Cardona et al.

(10) Patent No.: US 10,666,560 B2
(45) Date of Patent: May 26, 2020

(54) MAINTAINING APPARENT CONNECTIVITY DURING VIRTUAL SWITCH SERVICING

(71) Applicant: Microsoft Technology Licensing, LLC, Redmond, WA (US)

(72) Inventors: Omar Cardona, Bellevue, WA (US); Alexander Malysh, Bothell, WA (US); Sze K. Li, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 61 days.

(21) Appl. No.: 15/977,983

(22) Filed: May 11, 2018

(65) Prior Publication Data

US 2019/0349294 A1 Nov. 14, 2019

(51) Int. Cl.
*G06F 9/455* (2018.01)
*H04L 12/715* (2013.01)
(Continued)

(52) U.S. Cl.
CPC .......... *H04L 45/64* (2013.01); *G06F 9/45558* (2013.01); *H04L 45/586* (2013.01);
(Continued)

(58) Field of Classification Search
CPC ... H04L 41/082; H04L 45/586; H04L 41/069; H04L 41/0846; H04L 49/70; G06F 8/65
See application file for complete search history.

(56) References Cited

U.S. PATENT DOCUMENTS

| | | | |
|---|---|---|---|
| 8,799,419 B1 * | 8/2014 | Lin | H04L 45/586 709/220 |
| 8,943,490 B1 * | 1/2015 | Jain | H04Q 3/54516 717/168 |

(Continued)

FOREIGN PATENT DOCUMENTS

WO    WO 2018/077052    5/2018

OTHER PUBLICATIONS

Dell Storage Engineering, "Hyper-V Architecture and Networking Considerations for Small to Medium Businesses," Technical White Paper, pp. 1-36 (May 2014).

(Continued)

*Primary Examiner* — Dong U Kim
(74) *Attorney, Agent, or Firm* — Klarquist Sparkman, LLP

(57) ABSTRACT

Various innovations for servicing of a virtual switch in a virtual networking layer are presented. The innovations include new architectures for a virtual networking layer and new operations performed when servicing a virtual switch. In some example implementations, during virtual switch servicing, interruption to actual network connectivity is minimal—below a timeout threshold that signifies failure of a network connection. Connections for a host, VMs, and physical network adapter can be maintained while the virtual switch is serviced. Although some interruption to actual network connectivity happens, apparent connectivity (for a VM) over a connection between the VM and the virtual switch can be maintained during the servicing of the virtual (Continued)

software 180 implementing a virtual networking layer that maintains apparent connectivity during servicing of a virtual switch switch. Similarly, apparent connectivity (for a host) over a connection between the host and the virtual switch can be maintained during the servicing of the virtual switch.

20 Claims, 17 Drawing Sheets

(51) Int. Cl.
*H04L 12/713* (2013.01)
*H04L 12/931* (2013.01)

(52) U.S. Cl.
CPC .... *H04L 49/70* (2013.01); *G06F 2009/45583* (2013.01); *G06F 2009/45591* (2013.01); *G06F 2009/45595* (2013.01)

(56) References Cited

U.S. PATENT DOCUMENTS

2008/0147828 A1* 6/2008 Enstone ............. H04L 41/0846 709/220
2013/0114613 A1* 5/2013 Deshpande ........... H04L 45/586 370/401
2018/0052678 A1* 2/2018 Chigurapati .............. G06F 8/65
2019/0014000 A1* 1/2019 Ghag .................... H04L 41/082

OTHER PUBLICATIONS

Microsoft Corporation, "Poster Companion Reference: Hyper-V Networking," pp. 1-12 (2013).
Microsoft Corporation, "Virtualized Networking," downloaded from World Wide Web, pp. 1-271 (Apr. 2017).
Ram et al., "Hyper-Switch: A Scalable Software Virtual Switching Architecture," *USENIX Annual Technical Conf.*, pp. 13-24 (2013).
Firestone et al., "VFP: A Virtual Switch Platform for Host SDN in the Public Cloud," *Proc. USENIX Symp. on Networked Systems Design and Implementation*, pp. 315-328 (Mar. 2017).
International Search Report and Written Opinion dated Jul. 25, 2019, from International Patent Application No. PCT/US2019/030506, 20 pp.

* cited by examiner

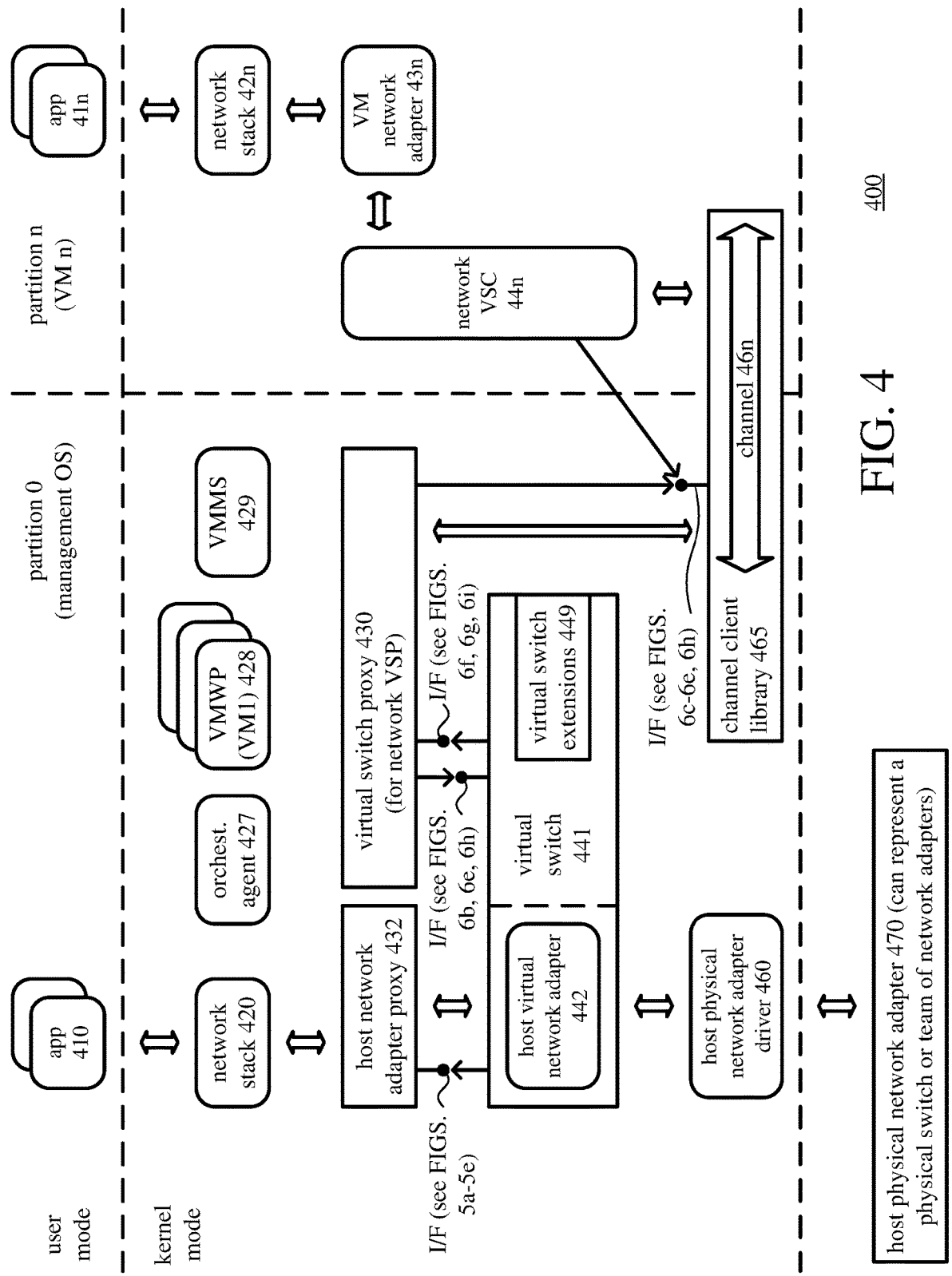

FIG. 5a 501

// copyright (c) Microsoft Corporation define VMS_NIC_PROXY_DEV       L"\\Device\\VmsNicProxy"
define VMS_NIC_PROXY_SYMBOLIC_NAME L"\\DosDevices\\VmsNicProxy"

//
// This IOCTL is used to register vmswitch with the proxy driver.
//
define IOCTL_VMS_NIC_PROXY_REGISTER  CTL_CODE(           \
                     FILE_DEVICE_UNKNOWN,  \
                     0x11,             \
                     METHOD_NEITHER,    \
                     FILE_ANY_ACCESS)

FIG. 5b 502

// copyright (c) Microsoft Corporation

// The following function prototypes and function pointer table define the
// callback interface implemented by the proxy driver. When vmswitch is
// registered with the proxy driver it may call these routines.
// typedef VOID (*VMS_NIC_PROXY_UNREGISTER) ();

typedef NDIS_STATUS (*VMS_NIC_PROXY_SET_MINIPORT_ATTRIBUTES) (
    _In_ NDIS_HANDLE NdisMiniportHandle,
    _In_ PNDIS_MINIPORT_ADAPTER_ATTRIBUTES MiniportAttributes );

typedef VOID (*VMS_NIC_PROXY_INDICATE_STATUS) (
    _In_ NDIS_HANDLE NdisMiniportHandle,
    _In_ PNDIS_STATUS_INDICATION StatusIndication );

typedef NDIS_STATUS (*VMS_NIC_PROXY_IM_INIT_DEV_INSTANCE)(
    _In_     NDIS_HANDLE DriverHandle,
    _In_     PNDIS_STRING DriverInstance,
    _In_opt_ NDIS_HANDLE  DeviceContext );

typedef NDIS_STATUS (*VMS_NIC_PROXY_SET_OPTIONAL_HANDLERS)(
    _In_ NDIS_HANDLE DriverHandle,
    _In_ PNDIS_DRIVER_OPTIONAL_HANDLERS  OptionalHandlers );

typedef NDIS_STATUS (*VMS_NIC_PROXY_NET_PNP_EVENT)(
    _In_ NDIS_HANDLE NdisMiniportHandle,
    _In_ PNET_PNP_EVENT_NOTIFICATION NetPnPEventNotification );

continued in FIG. 5c

FIG. 5c         503 continued from FIG. 5b

```
typedef NDIS_STATUS (*VMS_NIC_PROXY_CONFIG_SAVE)(
    _In_ NDIS_HANDLE NdisMiniportHandle,
    _In_reads_bytes_(Size) PVOID Buffer,
    _In_ ULONG Size );

typedef PVOID (*VMS_NIC_PROXY_CONFIG_RESTORE)(
    _In_ NDIS_HANDLE NdisMiniportHandle );

typedef VOID (*VMS_NIC_PROXY_MINIPORT_UNLOAD)(
    _In_ NDIS_HANDLE NdisMiniportHandle );

typedef NDIS_STATUS (*VMS_NIC_PROXY_LWM_INITIALIZE)(
    _In_ NDIS_HANDLE DriverHandle,
    _In_ NDIS_HANDLE MiniportAdapterContext,
    _In_ LPCGUID NetworkInterfaceGuid,
    _Out_ NDIS_HANDLE *NdisAdapterHandle );

typedef NDIS_STATUS (*VMS_NIC_PROXY_LWM_START)(
    _In_ NDIS_HANDLE NdisAdapterHandle );

typedef VOID (*VMS_NIC_PROXY_LWM_UNINITIALIZE)(
    _In_ NDIS_HANDLE NdisAdapterHandle );

typedef BOOLEAN (*VMS_NIC_PROXY_MINIPORT_RELOADED)(
    _In_ NDIS_HANDLE NdisAdapterHandle );
```

FIG. 5d         504

```
// copyright (c) Microsoft Corporation

// This structure defines the input parameters supplied by vmswitch when it
// registers with the proxy driver.
//
typedef struct _VMS_NIC_PROXY_REGISTER_IN {

NDIS_MINIPORT_DRIVER_CHARACTERISTICS MiniportChars;

} VMS_NIC_PROXY_REGISTER_IN, *PVMS_NIC_PROXY_REGISTER_IN;
```

FIG. 5e    505

```
// copyright (c) Microsoft Corporation

// This structure defines the output parameters for IOCTL_VMS_NIC_PROXY_REGISTER.
//
typedef struct _VMS_NIC_PROXY_REGISTER_OUT {

NDIS_HANDLE MiniportDriverHandle;
  NDIS_HANDLE MiniportDriverHandleLW;

BOOLEAN Reloaded;

// Wrapper for NdisMSetMiniportAttributes
  VMS_NIC_PROXY_SET_MINIPORT_ATTRIBUTES SetMiniportAttributes;

// Wrapper for NdisMIndicateStatusEx
  VMS_NIC_PROXY_INDICATE_STATUS IndicateStatus;

// Wrapper for NdisIMInitializeDeviceInstanceEx
  VMS_NIC_PROXY_IM_INIT_DEV_INSTANCE IMInitDevInstance;

// Wrapper for NdisSetOptionalHandlers
  VMS_NIC_PROXY_SET_OPTIONAL_HANDLERS SetOptionalHandlers;

// Wrapper for NdisMNetPnPEvent
  VMS_NIC_PROXY_NET_PNP_EVENT NetPnPEvent;

// Wrapper for NdisLWMInitializeNetworkInterface
  VMS_NIC_PROXY_LWM_INITIALIZE LWMInitialize;

// Wrapper for NdisLWMStartNetworkInterface
  VMS_NIC_PROXY_LWM_START LWMStart;

// Wrapper for NdisLWMUninitializeNetworkInterface
  VMS_NIC_PROXY_LWM_UNINITIALIZE LWMUninitialize;

VMS_NIC_PROXY_MINIPORT_RELOADED IsMiniportReloaded;

VMS_NIC_PROXY_CONFIG_SAVE ConfigSave;
  VMS_NIC_PROXY_CONFIG_RESTORE ConfigRestore;

VMS_NIC_PROXY_MINIPORT_UNLOAD MiniportUnload;
  VMS_NIC_PROXY_UNREGISTER Unregister;

} VMS_NIC_PROXY_REGISTER_OUT, *PVMS_NIC_PROXY_REGISTER_OUT;
```

FIG. 6a     601

// copyright (c) Microsoft Corporation include <ndis.h>
include <VmbusKernelModeClientLib.h>
include <NvspProtocol.h> define VMSWITCH_DEVICE_NAME L"\\Device\\VmSwitch"
define VMSWITCH_DOS_NAME L"\\DosDevices\\VmSwitch"

FIG. 6b     602

// copyright (c) Microsoft Corporation

// The following function prototypes and function pointer table define the
// callback interface implemented by vmswitch. When vmswitch is
// registered with the proxy driver, the proxy driver calls these routines.
//
typedef NTSTATUS (*VMSWITCH_CREATE_HANDLER) (
    __in PDEVICE_OBJECT DeviceObject,
    __in PIRP Irp );

typedef NTSTATUS (*VMSWITCH_CLOSE_HANDLER) (
    __in PDEVICE_OBJECT DeviceObject,
    __in PIRP Irp );

typedef NTSTATUS (*VMSWITCH_READ_HANDLER) (
    __in PDEVICE_OBJECT DeviceObject,
    __in PIRP Irp );

typedef NTSTATUS (*VMSWITCH_WRITE_HANDLER) (
    __in PDEVICE_OBJECT DeviceObject,
    __in PIRP Irp );

typedef NTSTATUS (*VMSWITCH_IOCTL_HANDLER) (
    __in PDEVICE_OBJECT DeviceObject,
    __in PIRP Irp );

```
// copyright (c) Microsoft Corporation

// The following functions are callback from the VMBus
// Kernel Mode Client Library. Defined in vmsproxy so that
// the function pointers will persist across vmswitch reload.
//
typedef VOID (*VMSWITCH_VMNICPVT_KMCL_PROCESSPACKET) (
    _In_ VMBCHANNEL Channel,
    _In_ VMBPACKETCOMPLETION PacketCompletionContext,
    _In_reads_bytes_(BufSize) PVOID PacketBuf,
    _In_ UINT32 BufSize,
    _In_ UINT32 Flags );

typedef NTSTATUS (*VMSWITCH_VMNICPVT_KMCL_CHANNELOPENED) (
    _In_ VMBCHANNEL VmbChannel );

typedef VOID (*VMSWITCH_VMNICPVT_KMCL_CHANNELCLOSED) (
    _In_ VMBCHANNEL VmbChannel );

typedef NTSTATUS (*VMSWITCH_VMNICPVT_KMCL_CHANNELSAVEPACKET) (
    _In_ VMBCHANNEL VmbChannel,
    _In_ VMBPACKET Packet,
    _Out_writes_bytes_(SaveBufSize) PVOID SaveBuf,
    _In_ UINT32 SaveBufSize,
    _Out_ PUINT32 BytesNeeded );

typedef NTSTATUS (*VMSWITCH_VMNICPVT_KMCL_CHANNELRESTOREPACKET) (
    _In_ VMBCHANNEL VmbChannel,
    _In_reads_bytes_(LibBufSize) PVOID LibBuf,
    _In_ UINT32 LibBufSize,
    _In_reads_bytes_(SaveBufSize) PVOID SaveBuf,
    _In_ UINT32 SaveBufSize );

typedef VOID (*VMSWITCH_VMNICPVT_KMCL_PACKETSENT) (
    _In_ VMBPACKET PacketObject,
    _In_ NTSTATUS Status,
    _In_reads_bytes_(Length) PVOID Buffer,
    _In_ UINT32 Length );

typedef VOID (*VMSWITCH_VMNICPVT_KMCL_CHANNELSUSPEND) (
    _In_ VMBCHANNEL Channel );

typedef VOID (*VMSWITCH_VMNICPVT_KMCL_CHANNELSTARTED) (
    _In_ VMBCHANNEL Channel );

typedef VOID (*VMSWITCH_VMNICPVT_KMCL_PROCESSINGCOMPLETE) (
    _In_ VMBCHANNEL Channel,
    _In_ UINT32 PacketCount );
``` continued in FIG. 6d

FIG. 6d     604 continued from FIG. 6c

```
typedef VOID (*VMSWITCH_VMNICPVT_VERSION6HANDLE_RXPDBATCH) (
    _In_ VMBCHANNEL VmbChannel,
    _In_ VMBPACKETCOMPLETION PacketCompletionContext,
    __in_data_source(GUEST) PNVSP_6_MESSAGE_PD_BATCH_MESSAGE Message,
    _In_ UINT32 BufSize,
    _In_ UINT32 Flags );

typedef VOID (*VMSWITCH_VMNICPVT_VERSION6HANDLE_TXPDBATCH) (
    _In_ VMBCHANNEL VmbChannel,
    _In_ VMBPACKETCOMPLETION PacketCompletionContext,
    __in_data_source(GUEST) PNVSP_6_MESSAGE_PD_BATCH_MESSAGE Message,
    _In_ UINT32 BufSize,
    _In_ UINT32 Flags );

typedef NTSTATUS (*VMSWITCH_VMPDPVT_KMCL_CHANNELOPENED) (
    _In_ VMBCHANNEL VmbChannel );

typedef VOID (*VMSWITCH_VMPDPVT_KMCL_CHANNELCLOSED) (
    _In_ VMBCHANNEL VmbChannel );
```

// copyright (c) Microsoft Corporation

```
typedef struct _VMSPROXY_VMSWITCH_HANDLER_TABLE {
    VMSWITCH_CREATE_HANDLER CreateHandlerRoutine;
    VMSWITCH_CLOSE_HANDLER CloseHandlerRoutine;
    VMSWITCH_READ_HANDLER ReadHandlerRoutine;
    VMSWITCH_WRITE_HANDLER WriteHandlerRoutine;
    VMSWITCH_IOCTL_HANDLER IoctlHandlerRoutine;
    VMSWITCH_VMNICPVT_KMCL_PROCESSPACKET VmNicPvtKmclProcessPacketRoutine;
    VMSWITCH_VMNICPVT_KMCL_CHANNELOPENED VmNicPvtKmclChannelOpenedRoutine;
    VMSWITCH_VMNICPVT_KMCL_CHANNELCLOSED VmNicPvtKmclChannelClosedRoutine;
    VMSWITCH_VMNICPVT_KMCL_CHANNELSAVEPACKET VmNicPvtKmclChannelSavePacketRoutine;
    VMSWITCH_VMNICPVT_KMCL_CHANNELRESTOREPACKET VmNicPvtKmclChannelRestorePacketRoutine;
    VMSWITCH_VMNICPVT_KMCL_PACKETSENT VmNicPvtKmclPacketSentRoutine;
    VMSWITCH_VMNICPVT_KMCL_CHANNELSUSPEND VmNicPvtKmclChannelSuspendRoutine;
    VMSWITCH_VMNICPVT_KMCL_CHANNELSTARTED VmNicPvtKmclChannelStartedRoutine;
    VMSWITCH_VMNICPVT_KMCL_PROCESSINGCOMPLETE VmNicPvtKmclProcessingCompleteRoutine;
    VMSWITCH_VMNICPVT_VERSION6HANDLE_RXPDBATCH VmNicPvtVersion6HandleRxPdBatchRoutine;
    VMSWITCH_VMNICPVT_VERSION6HANDLE_TXPDBATCH VmNicPvtVersion6HandleTxPdBatchRoutine;
    VMSWITCH_VMPDPVT_KMCL_CHANNELOPENED VmPDPvtKmclChannelOpenedRoutine;
    VMSWITCH_VMPDPVT_KMCL_CHANNELCLOSED VmPDPvtKmclChannelClosedRoutine;
} VMSPROXY_VMSWITCH_HANDLER_TABLE, *PVMSPROXY_VMSWITCH_HANDLER_TABLE;
```

FIG. 6f  <u>606</u>

```
// copyright (c) Microsoft Corporation

// The following function prototypes and function pointer table define the
// callback interface implemented by the proxy driver. When vmswitch is
// registered with the proxy driver it may call these routines.
//
typedef VOID (*VMSPROXY_UNREGISTER) (
   _In_ PVOID ProxyContext );

typedef BOOLEAN (*VMSPROXY_GET_IS_SERVICINGSTARTED) ();

typedef BOOLEAN (*VMSPROXY_SET_IS_SERVICINGSTARTED) (
   _In_ BOOLEAN Value);

typedef VOID (*VMSPROXY_SET_VMBCHANNEL_CALLBACKS) (
   _In_ VMBCHANNEL Channel,
   _In_ BOOLEAN IsPrimaryChannel,
   _In_ BOOLEAN IsReceiveChannel,
   _In_ BOOLEAN IsPD );

typedef NTSTATUS (*VMSPROXY_VMBCHANNEL_ALLOCATE) (
   _In_ PUNICODE_STRING NicName,
   _In_ UINT16       ChannelIndex,
   _In_ PDEVICE_OBJECT  ParentDeviceObject,
   _Out_ VMBCHANNEL    *Channel );

typedef NTSTATUS (*VMSPROXY_VMBCHANNEL_CLEANUP_WHEN_NOT_SERVICING) (
   _In_ PUNICODE_STRING NicName,
   _In_ UINT16       ChannelIndex,
   _In_ VMBCHANNEL    VmbChannel );

typedef struct _VMSPROXY_PROXY_HANDLER_TABLE {
   VMSPROXY_UNREGISTER UnregisterRoutine;
   VMSPROXY_GET_IS_SERVICINGSTARTED GetIsServicingStartedRoutine;
   VMSPROXY_SET_IS_SERVICINGSTARTED SetIsServicingStartedRoutine;
   VMSPROXY_SET_VMBCHANNEL_CALLBACKS SetVmbChannelCallbacksRoutine;
   VMSPROXY_VMBCHANNEL_ALLOCATE VmbChannelAllocateRoutine;
   VMSPROXY_VMBCHANNEL_CLEANUP_WHEN_NOT_SERVICING
VmbChannelCleanupRoutine;
} VMSPROXY_PROXY_HANDLER_TABLE, PVMSPROXY_PROXY_HANDLER_TABLE;
```

FIG. 6g  *607*

// copyright (c) Microsoft Corporation

// This IOCTL is used to register vmswitch with the proxy driver.
//
```
#define IOCTL_VMSPROXY_REGISTER  CTL_CODE(           \
                    FILE_DEVICE_UNKNOWN,  \
                    0x10,            \
                    METHOD_BUFFERED,     \
                    FILE_ANY_ACCESS)
```

FIG. 6h  *608*

// copyright (c) Microsoft Corporation

// This structure defines the input parameters supplied by vmswitch when it
// registers with the proxy driver.
//
```
typedef struct _VMSPROXY_VMSWITCH_REGISTER_IN {
   PVOID VmSwitchContext;
   PDRIVER_OBJECT VmSwitchDriverObject;
   VMSPROXY_VMSWITCH_HANDLER_TABLE VmSwitchHandlers;
} VMSPROXY_VMSWITCH_REGISTER_IN, *PVMSPROXY_VMSWITCH_REGISTER_IN;
```

FIG. 6i  *609*

// copyright (c) Microsoft Corporation

// This structure defines the output parameters for IOCTL_VMSWITCH_REGISTER.
//
```
typedef struct _VMSPROXY_VMSWITCH_REGISTER_OUT {
   PVOID ProxyContext;
   VMSPROXY_PROXY_HANDLER_TABLE ProxyHandlers;
} VMSPROXY_VMSWITCH_REGISTER_OUT, *PVMSPROXY_VMSWITCH_REGISTER_OUT;
```

MAINTAINING APPARENT CONNECTIVITY DURING VIRTUAL SWITCH SERVICING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In a computer system, hardware virtualization abstracts away low-level details of hardware of the computer system from users, instead presenting a virtual computing platform whose resources can be used. Typically, input devices, output devices, network adapters, and other hardware devices of the computer system are presented as logical abstractions in the virtual platform. Processing units, memory, storage of the computer system are similarly hidden from users. In many common configurations, the computer system supports multiple partitions. In a host (parent or root) partition, a host controls how the virtual platform is used in one or more guest (child) partitions. In a guest partition, the host creates a simulated computer environment—a virtual machine ("VM")—in which guest software executes. A guest OS can be installed in the VM, using the virtualized resources of the virtual platform, and applications can execute in conjunction with the guest OS in the VM. The guest OS and applications in the VM execute as if running directly on physical hardware, albeit with some restrictions on access to system resources. The host can access hardware resources of the computer system. When a guest OS or application in a VM uses virtualized resources, the host can mediate access to the hardware resources of the computer system. This prevents guest software from misusing or overusing system resources such as network access, storage, memory, and processing units.

A virtual platform can hide details of a physical network adapter used to access a network. Instead, guest software in a guest partition connects to the network through a virtual networking layer. In a physical network, a network switch has multiple ports and routes traffic from any one port of the network switch to any other port of the network switch. Analogously, a virtual networking layer can include a virtual switch, which is able to route traffic from any one port of the virtual switch to any other port of the virtual switch. In a typical configuration, one of the ports of the virtual switch is connected to a physical network adapter (that is connected to an external network), and other ports of the virtual switch are connected to VMs. The virtual switch allows one physical network adapter to provide network connectivity to an arbitrary number of VMs. The virtual switch can also connect to a host.

From time to time, a virtual switch is updated or otherwise changed. In order to swap versions of the virtual switch, connections to the virtual switch are disconnected or disabled. In practice, changing versions of a virtual switch can involve (1) disabling a physical network adapter for a host, (2) disabling virtual network adapters for VMs, (3) disabling a virtual network adapter for the host, (4) unloading the previous version of the virtual switch from memory, (5) loading a current version of the virtual switch into memory, (6) restoring/enabling the physical network adapter for the host, (7) restoring/enabling the virtual network adapters for VMs, and (8) restoring/enabling the virtual network adapter for the host. Disabling a physical or virtual network adapter can tear down a network connection used by the host or a VM. This may cause an application running on the host or VM to stop, or otherwise cause disruption to the application as the host or VM manages the loss and recovery of the network connection. The state of a VM may need to be saved then restored, or an application may need to be restarted, potentially resulting in significant downtime, loss of correct application state, and/or loss of data. In particular, loss of functionality for applications running on the host (e.g., to monitor VMs, perform diagnostic tests, or track which applications running on the host or VMs are active) can result in significant downtime and revenue loss for a cloud service provider, which may host commercial Web services or critical infrastructure services for a business or other organization. Even if the loss of network connections for the host and VMs is managed gracefully, network connectivity for the host and VMs is interrupted during the process of servicing the virtual switch. The consequences of virtual switch servicing can be a significant problem for cloud service providers. According to terms of a service agreement, a cloud service provider may be required to offer steep discounts or pay refunds if network connectivity is interrupted for longer than a minimal duration.

SUMMARY

In summary, the detailed description presents various innovations for servicing of a virtual switch in a virtual networking layer. The innovations include new architectures for a virtual networking layer and new operations performed when servicing a virtual switch. In some example implementations, during virtual switch servicing, the interruption to actual network connectivity is minimal—below a timeout threshold that signifies failure of a network connection. Connections for a host, VMs, and physical network adapter can be maintained while the virtual switch is serviced. Although some interruption to actual network connectivity happens, apparent connectivity (for a VM) over a connection between the VM and the virtual switch can be maintained during the servicing of the virtual switch. Similarly, apparent connectivity (for a host) over a connection between the host and the virtual switch can be maintained during the servicing of the virtual switch.

According to one aspect of the innovations described herein, a computer system provides a virtual networking layer. The virtual networking layer includes a virtual switch and a virtual switch proxy. The virtual switch is configured to transfer data between multiple ports of the virtual switch. The virtual switch proxy is configured to, for each of the VM(s), mediate transfers of data over a connection, through a VM network adapter, between the VM and the virtual switch. The virtual switch proxy is also configured to, when changing versions of the virtual switch, persist state information that defines features of the connection through the VM network adapter. This facilitates maintenance of apparent connectivity for the VM over the connection through the VM network adapter. For example, the virtual switch proxy can be configured to save and retrieve state information for the VM network adapter of the connection, and/or save and retrieve state information for a channel between the virtual switch and the VM.

The virtual networking layer can also include a host network adapter proxy. The host network adapter proxy is configured to, for a host connected to the virtual networking layer, mediate transfers of data over a connection, through a host virtual network adapter, between the host and the virtual switch. The host network adapter proxy is also configured to, when changing the versions of the virtual switch, persist state information that defines features of the connection through the host virtual network adapter. This facilitates maintenance of apparent connectivity for the host over the connection through the host virtual network adapter. For example, the host network adapter proxy can be configured to save and retrieve state information for the host virtual network adapter of the connection, and/or save and retrieve state information for a host physical network adapter.

According to another aspect of the innovations described herein, in a computer system that provides a virtual networking layer, an orchestration agent performs operations to service a virtual switch. The orchestration agent pauses network traffic through the virtual switch and, for each of the VM(s) connected to the virtual switch, saves state information for a VM network adapter of a connection between the VM and the virtual switch. The orchestration agent unloads a first version of the virtual switch from memory and loads a second version of the virtual switch into memory. For each of the VM(s), the orchestration agent retrieves the state information for the VM network adapter of the connection between the VM and the virtual switch, and restores state of the VM network adapter. The orchestration agent then resumes network traffic through the virtual switch. In this way, for a VM, apparent connectivity over its connection to the virtual switch can be maintained during the servicing of the virtual switch.

The orchestration agent can also perform operations that involve a host physical network adapter. For example, before pausing network traffic through the virtual switch, the orchestration agent can save state information for a host physical network adapter, and release any hardware resources allocated from the host physical network adapter for traffic acceleration. After loading the second version of the virtual switch into memory, the orchestration agent can retrieve the state information for the host physical network adapter and restore state of the host physical network adapter. After resuming network traffic through the virtual switch, the orchestration agent can bind to the host physical network adapter, thereby enabling allocation of hardware resources from the host physical network adapter for traffic acceleration. In this way, for a host, apparent connectivity over its connection to the virtual switch can be maintained during the servicing of the virtual switch.

According to another aspect of the innovations described herein, in a computer system that provides a virtual networking layer, one or more service managers perform operations to configure the virtual networking layer. The service manager(s) load a virtual switch proxy into memory and load a virtual switch into memory. The service manager(s) register the virtual switch with the virtual switch proxy. For each of the VM(s), the service manager(s) create a connection between the VM and the virtual switch. The service manager(s) can also load a host network adapter proxy into memory and register the virtual switch with the host network adapter proxy. In this way, the service manager(s) can initialize the virtual networking layer to perform operations to service a virtual switch, as described above.

The innovations can be implemented as part of a method, as part of a computer system configured to perform the method or as part of a tangible computer-readable media storing computer-executable instructions for causing a computer system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures

BRIEF DESCRIPTION OF THE DRAWINGS

FIGS. 3a, 3b, and 4 are diagrams showing example architectures that include a network virtualization layer with a virtual switch and virtual switch proxy.

FIGS. 5a-5e are listings of function prototypes, interfaces, parameters used in registration, and other structures for a virtual switch and a host network adapter proxy.

FIG. 6a-6i are listings of function prototypes, interfaces, parameters used in registration, and other structures for a virtual switch and a virtual switch proxy.

DETAILED DESCRIPTION

Figure 1:
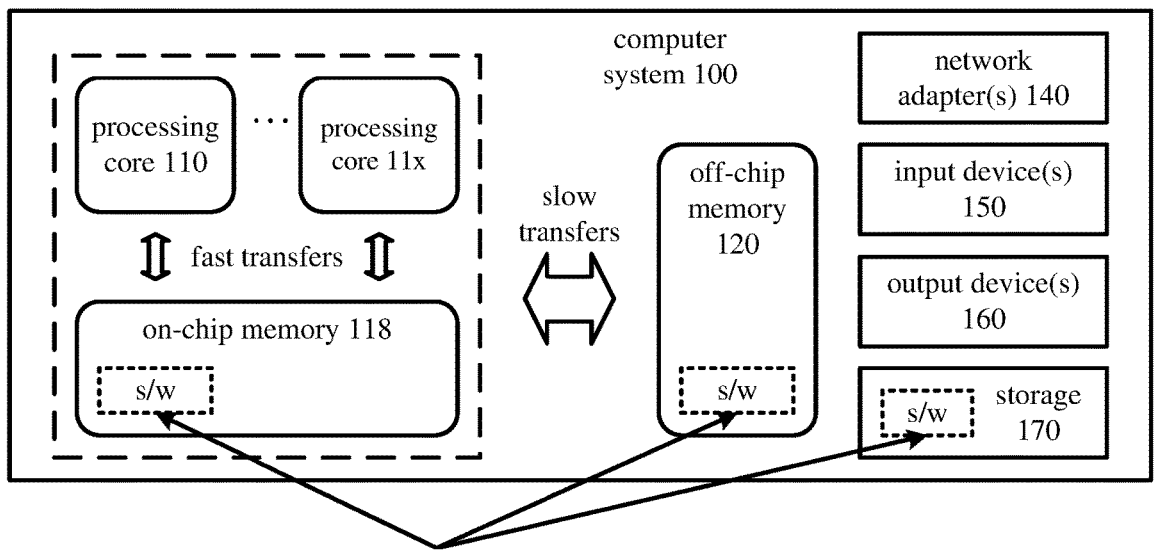
FIG. 1 is a diagram showing an example computer system in which some described embodiments can be implemented.

The detailed description presents various innovations for servicing of a virtual switch in a virtual networking layer. In particular, the innovations include new architectures for a virtual networking layer and new operations performed when servicing a virtual switch. In some example implementations, state information defining various features of connections is persisted before unloading the previous version of a virtual switch, then used to restore the state of the connections after loading the current version of the virtual switch. The interruption to actual network connectivity is minimal—below a timeout threshold that signifies failure of a network connection. Depending on implementation, the innovations can provide various advantages.

For example, apparent network connectivity for a host can be maintained during virtual switch servicing. Applications (e.g., monitoring applications, diagnostic applications) running on the host may continue normal operations during the virtual switch servicing, without loss of application state or data, and with minimal or no disruption to networking operations. Network traffic can be buffered in the virtual networking layer during the virtual switch servicing, then delivered normally.

As another example, the state of a network adapter can appear operational, from the perspective of a host, during virtual switch servicing. A host network adapter proxy can remain in memory during the virtual switch servicing, so that the host apparently remains connected (through the virtual switch) to the network adapter. Or, a virtual switch proxy can remain in memory during the virtual switch servicing, so that the host apparently remains connected (through the virtual switch) to the network adapter. Applications running on the host need not perform special operations to maintain a network connection during virtual switch servicing.

As another example, virtual switch servicing can happen without disabling a host physical network adapter. State information for the host physical network adapter can be saved then retrieved in order to quickly restore the state of the host physical network adapter.

As another example, apparent network connectivity for a VM can be maintained during virtual switch servicing. Applications running on a VM may continue normal operations during the virtual switch servicing, without loss of application state or data, and with minimal or no disruption to networking operations. Network traffic can be buffered in the virtual networking layer during the virtual switch servicing, then delivered normally.

As another example, the state of a network adapter can appear operational, from the perspective of a VM, during virtual switch servicing. A virtual switch proxy can remain in memory during the virtual switch servicing, so that the VM apparently remains connected (through the virtual switch) to the network adapter. Applications running on the VM need not perform special operations to maintain a network connection during virtual switch servicing.

As another example, a VM can continue to run during virtual switch servicing. Despite swapping of versions of a virtual switch that provides network connectivity, pauses and restarts of the VM can be avoided.

As another example, the process of virtual switch servicing can be sped up. By saving/retrieving state information in a virtual switch proxy and/or in a host network adapter proxy, the state of connections to a virtual switch can be quickly restored, without tearing down and re-creating the connections. Further, by releasing hardware resources allocated for traffic acceleration before virtual switch servicing begins (while network traffic can still flow slowly through the virtual switch), the time consumed by virtual switch servicing can be reduced.

Thus, connections for a host, VMs, and physical network adapter can be maintained while a virtual switch is serviced. Although some interruption to actual network connectivity happens, apparent connectivity over a connection can be maintained during the servicing of the virtual switch.

Although a connection between a virtual switch and a network adapter (e.g., virtual network adapter or physical network adapter) can be direct, typically the connection passes through one or more layers of intermediate drivers. A connection between a virtual switch and a network adapter (e.g., virtual network adapter or physical network adapter) can use a logical communication channel (such as a VM bus channel or other channel) between the virtual switch and the network adapter. The term "connection" does not denote or imply a direct, physical connection between two connected components.

Various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computer Systems.

FIG. 1 illustrates a generalized example of a suitable computer system (100) in which several of the described innovations may be implemented. The innovations described herein relate to virtual switch servicing. Aside from its use in virtual switch servicing, the computer system (100) is not intended to suggest any limitation as to scope of use or functionality, as the innovations may be implemented in diverse computer systems, including special-purpose computer systems adapted for networking and/or hardware virtualization.

With reference to FIG. 1, the computer system (100) includes one or more processing cores (110 . . . 11x) of a central processing unit ("CPU") and local, on-chip memory (118). The processing core(s) (110 . . . 11x) execute computer-executable instructions. The number of processing core(s) (110 . . . 11x) depends on implementation and can be, for example, 4 or 8. The local memory (118) may be volatile memory (e.g., registers, cache, RAM), non-volatile memory (e.g., ROM, EEPROM, flash memory, etc.), or some combination of the two, accessible by the respective processing core(s) (110 . . . 11x).

The local memory (118) can store software (180) implementing a virtual networking layer that maintains apparent connectivity during servicing of a virtual switch, for operations performed by the respective processing core(s) (110 . . . 11x), in the form of computer-executable instructions. In FIG. 1, the local memory (118) is on-chip memory such as one or more caches, for which access operations, transfer operations, etc. with the processing core(s) (110 . . . 11x) are fast.

The computer system (100) can include processing cores (not shown) and local memory (not shown) of a graphics processing unit ("GPU"). The number of processing cores of the GPU depends on implementation. Alternatively, the computer system (100) includes one or more processing cores of a system-on-a-chip ("SoC"), application-specific integrated circuit ("ASIC") or other integrated circuit, along with associated memory. The processing core(s) can execute computer-executable instructions for one or more innovations for virtual switch servicing.

The computer system (100) includes shared memory (120), which may be volatile memory (e.g., RAM), non-volatile memory (e.g., ROM, EEPROM, flash memory, etc.), or some combination of the two, accessible by the processing core(s). The memory (120) stores software (180) implementing a virtual networking layer that maintains apparent connectivity during servicing of a virtual switch, in the form of computer-executable instructions. In FIG. 1, the shared memory (120) is off-chip memory, for which access operations, transfer operations, etc. with the processing cores are slower.

The computer system (100) includes one or more network adapters (140). As used herein, the term network adapter indicates any network interface card ("NIC"), network interface, network interface controller, or network interface device. Typically, a network adapter supports communication at the data link layer and physical layer. Depending on its role, a network adapter can be software (e.g., a VM network adapter or host virtual network adapter) or hardware (e.g., a host physical network adapter). The network adapter(s) (140) enable communication over a network to another computing entity (e.g., server, other computer system). The network can be a wide area network, local area network, storage area network or other network. The network adapter(s) (140) can support wired connections and/or wireless connections, for a wide area network, local area network, storage area network or other network. For example, the network adapter(s) (140) can include one or more Wi-Fi transceivers, an Ethernet port, a cellular transceiver, and/or another type of network adapter, along with associated drivers, software, etc. The network adapter(s)

(140) convey data in a modulated data signal over network connection(s). A modulated data signal is a signal that has one or more of its characteristics set or changed in such a manner as to encode information in the signal. By way of example, and not limitation, the network connections can use an electrical, optical, RF, or other carrier.

The computer system (100) also includes one or more input device(s) (150). The input device(s) may be a touch input device such as a keyboard, mouse, pen, or trackball, a scanning device, or another device that provides input to the computer system (100). The computer system (100) can also include a camera input, an audio input, a motion sensor/tracker input, a game controller input, a media player, and/or a video input.

The computer system (100) includes one or more output devices (160). The output device(s) (160) may be a printer, CD-writer, or another device that provides output from the computer system (100). A video output can provide video output to a display device. An audio output can provide audio output to one or more speakers.

The storage (170) may be removable or non-removable, and includes magnetic media (such as magnetic disks, magnetic tapes or cassettes), optical disk media and/or any other media which can be used to store information and which can be accessed within the computer system (100). The storage (170) stores instructions for the software (180) implementing a virtual networking layer that maintains apparent connectivity during servicing of a virtual switch.

An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The computer system (100) of FIG. 1 is a physical computer system (e.g., for a host computer system). A virtual machine can include components organized as shown in FIG. 1.

The innovations can be described in the general context of computer-readable media. Computer-readable media are any available tangible media that can be accessed within a computing environment. By way of example, and not limitation, with the computer system (100), computer-readable media include memory (118, 120), storage (170), and combinations thereof. The term computer-readable media does not encompass transitory propagating signals or carrier waves.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU or special-purpose hardware to provide functionality described herein, instructions executable on processing cores of a GPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

In general, a computer system or device can be local or distributed, and can include any combination of special-purpose hardware and/or hardware with software implementing the functionality described herein. For the sake of presentation, the detailed description uses terms like "determine," "receive" and "provide" to describe computer operations in a computer system. These terms denote operations performed by a computer and should not be confused with acts performed by a human being. The actual computer operations corresponding to these terms vary depending on implementation.

II. Example Architectures for Hardware Virtualization.

Figure 2:
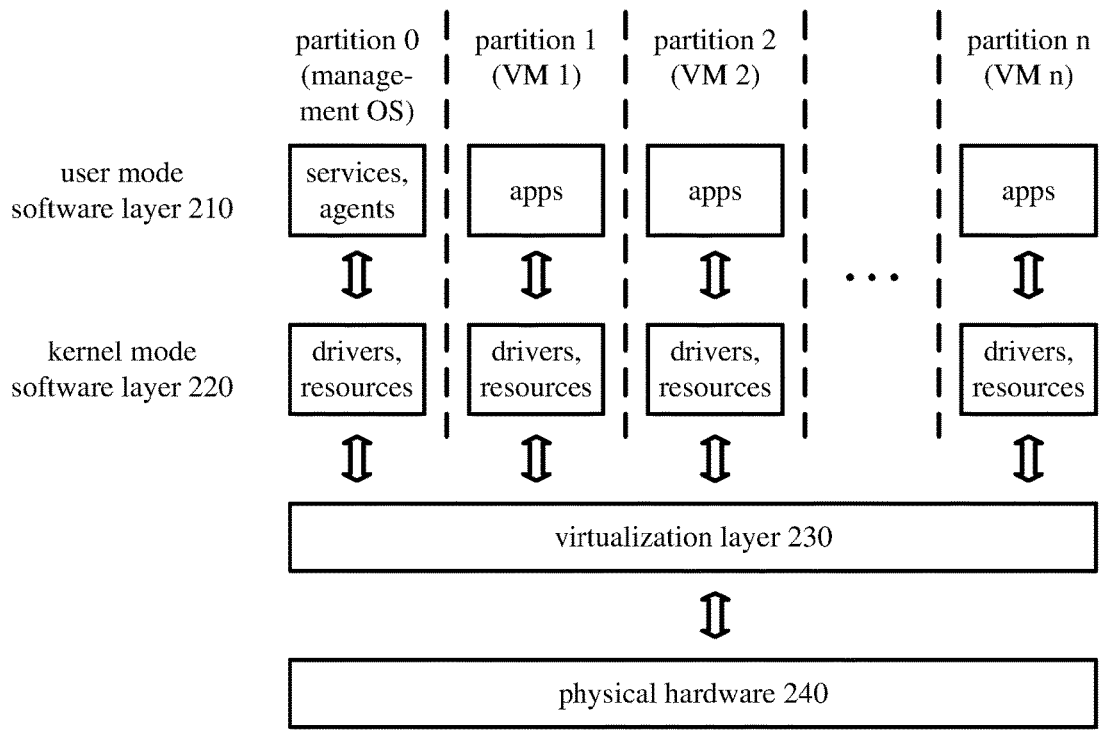
FIG. 2 is a diagram showing an example computer system that uses hardware virtualization.

This section describes example architectures for hardware virtualization. FIG. 2 shows a computer system (200) that uses hardware virtualization. The computer system (200) includes a user mode software layer (210), a kernel mode software layer (220), a virtualization layer (230), and physical hardware (240).

The physical hardware (240) includes various types of hardware devices. For example, the physical hardware (240) includes processing cores, memory, storage, one or more network adapters, input devices, and/or output devices, as described with reference to the computer system (100) of FIG. 1. In particular, the physical hardware (240) includes at least one host physical network adapter that is configurable to connect to an external network, which can be a wide area network, local area network, storage area network, or other network.

The virtualization layer (230) is a layer of software that runs between the physical hardware (240) and OSs that run in partitions. The virtualization layer (230) abstracts away low-level details of the physical hardware (240) of the computer system (200). The virtualization layer (230) presents input devices, output devices, network adapters, and other hardware devices of the computer system (200) as resources that may be used from partitions. The virtualization layer (230) similarly hides details of processing cores, memory, and storage, instead presenting system resources that may be allocated to partitions.

Through the virtualization layer (230), the computer system (200) supports multiple partitions, which are isolated execution environments. The partitions include a host (parent or root) partition, which is shown as partition 0, and multiple guest (child) partitions, which are shown as partitions 1 . . . n. The virtualization layer (230) provides each partition with a set of virtualized resources such as memory, processing cycles, input devices, output devices, network adapters, etc. The virtualization layer (230) can manage policies for access to resources from different partitions.

The host partition includes software for a host, which manages resources of the computer system (200) and controls how the virtualization layer (230) is used in other partitions. The host partition is responsible for starting the virtualization layer (230) and creating guest partitions. Typically, the host has privileged access to the physical hardware (240) of the computer system (200), at least for some types of resources. The host is sometimes called a management OS, control program, virtual machine monitor, or host software.

Each guest partition includes a virtual machine ("VM"), which is a simulated computer environment in which guest software executes. For example, a VM is a virtual guest computer that is implemented in software and hosted in a guest partition. Each VM executes in a different guest partition. Typically, a VM emulates a complete computer system in the isolated environment of the guest partition. A VM can host a guest OS, with applications running on the guest OS in the VM. In general, a VM has unprivileged access—not direct access—to the physical hardware (240) resources of the computer system (200). Guest software in the VM can use virtualized resources exposed through the virtualization layer (230). When guest software in a VM uses virtualized resources, requests can be directed to the host, which mediates access to the resources of the physical hardware (240).

In partition 0, the kernel mode software layer (220) includes drivers and resources for a management OS. Some drivers/resources are used to access physical hardware (240) of the computer system (200). Other drivers/resources in partition 0 interact with the virtualization layer (230) to mediate access to resources of the computer system (200), or interact with drivers/resources in partitions 1 . . . n. In particular, for partition 0, the drivers/resources of the kernel mode software layer (220) include network protocol drivers (e.g., for TCP/IP) and virtual networking layer components (such as virtual network adapters, a virtual switch, a virtual switch proxy, a host network adapter proxy, and/or a host physical network adapter driver).

In each of partitions 1 . . . n, the kernel mode software layer (220) includes drivers and resources for a guest OS of a VM. In partitions 1 . . . n, drivers/resources interact with the virtualization layer (230) to request and use resources of the computer system (200), as exposed through the virtualization layer (230), or interact with drivers/resources in partition 0. In particular, for partitions 1 . . . n, the drivers/resources of the kernel mode software layer (220) include network protocol drivers (e.g., for TCP/IP) and virtual networking layer components (such as VM network adapters and/or network virtual service clients).

Conceptually, there are some similarities between the kernel mode software layer (220) and virtualization layer (230). Both layers abstract away lower-level details of resources and present access to those resources to higher-level components. Drivers/resources of the kernel mode software layer (220), however, are generally allocated to a specific partition and execute within that partition (although some inter-partition communication is supported by drivers/resources in a virtual networking layer). The virtualization layer (230) facilitates communication between the host and VMs in different partitions.

The user mode software layer (210) includes software that runs in a partition and uses the drivers/resources of the kernel mode software layer (220). In partitions 1 . . . n, the user mode software layer (210) includes arbitrary applications that execute in the VMs. The applications execute as if running directly on physical hardware, albeit with some restrictions on access to system resources. In partition 0, the user mode software layer (210) includes arbitrary applications as well as services, agents, etc. that execute on behalf of the host.

III. Example Architectures for Virtual Networking Layers.

This section describes example architectures for a virtual networking layer in which a virtual switch can be serviced efficiently. Depending on configuration, the virtual networking layer can connect one or more virtual machines ("VMs") to a host and/or an external network. In some of the example architectures, the virtual networking layer includes a virtual switch and virtual switch proxy. In other example architectures, the virtual networking layer includes a virtual switch, virtual switch proxy, and host network adapter proxy.

A. Example Virtual Switches.

A physical network switch has multiple ports and routes traffic from any one port of the network switch to any other port of the network switch. Analogously, a virtual switch in a virtual networking layer is able to route traffic from a port of the virtual switch to another port of the virtual switch. Typically, the virtual switch can route traffic from any port of the virtual switch to any other port of the virtual switch, but alternatively some parts may be isolated or separated from other ports. In some configurations, one of the ports of the virtual switch is connected to a physical network adapter, which is connected to an external network, and other ports of the virtual switch are connected to VMs. A VM connects to the virtual switch through a virtual network adapter (VM network adapter). In some example implementations, the VM network adapter has a media access control ("MAC") address. In this way, a virtual switch allows one physical network adapter to provide network connectivity to an arbitrary number of VMs. Through the virtual switch, which forwards the packet to the target, the VM can send a packet to the host (through a virtual network adapter for the host), to another VM (through the VM network adapter for that VM), or over the external network (through the physical network adapter).

The virtual switch can connect to a host, enabling the host to communicate with the VMs and/or connect to the external network through the virtual switch. A host connects to the virtual switch through a virtual network adapter (host virtual network adapter). In some example implementations, the host virtual network adapter has a MAC address. Through the virtual switch, which forwards the packet to the target, the host can send a packet to a VM (through the VM network adapter for the VM) or over the external network (through the physical network adapter).

A virtual switch performs basic routing functions as a switch (or hub or bridge), for example, using MAC addresses to process and forward packets to a destination. This provides "layer 2" functionality according to the OSI networking stack model. In some example implementations, the virtual switch can also act as a router, providing "layer 3" functionality according to the OSI networking stack model.

In some example implementations, the virtual switch is extensible. A switch extension is a filter driver that attaches to the virtual switch. The virtual switch can include extensions that perform additional functions such as capturing network traffic, filtering network traffic, monitoring network traffic, or forwarding network traffic (to virtual or physical network adapters connected to ports of the virtual switch).

In some example implementations, a virtual switch can be configured to act as a private virtual switch, internal virtual switch, or external virtual switch. If the virtual switch is configured to act as a private virtual switch, (a) each of at least two of the ports of the virtual switch is connected to a different VM, (b) none of the ports of the virtual switch is connected to an external network, and (c) none of the ports of the virtual switch is connected to the host. Through the private virtual switch, network traffic can be exchanged between any two VMs but not the host or an external network. If the virtual switch is configured to act as an internal virtual switch, (a) each of at least one of the ports of the virtual switch is connected to a different VM, (b) none of the ports of the virtual switch is connected to an external network, and (c) the virtual switch is connected to a host through a host virtual network adapter. Through the internal virtual switch, network traffic can be exchanged between any two VMs or between any VM and the host, but not an external network. If the virtual switch is configured to act as an external virtual switch, (a) each of at least one of the ports of the virtual switch is connected to a different VM, (b) one of the ports of the virtual switch is connected to an external network through a host physical network adapter, and (c) the virtual switch may be connected to a host through a host virtual network adapter. Through the external virtual switch, network traffic can be exchanged between any two VMs, between any VM and the host, between any VM and the external network, or between the host and the external network.

B. Example Virtual Networking Layer with a Virtual Switch Proxy.

This section describes an example architecture that includes a virtual networking layer with a virtual switch proxy. In the example architecture (301) of FIG. 3a, the virtual switch (350) supports networking operations for a host and multiple VMs, which run in different partitions. The host runs in partition 0, and the VMs run in partitions 1 . . . n, respectively.

One or more applications (310) run in the host partition. The application(s) (310) can include a monitoring agent, a diagnostic application, and/or an application that checks for activity of applications in the host and guest partitions, which reports "liveliness" updates to a central server. The application(s) (310) can also include another arbitrary application.

The application(s) (310) are bound to a network stack (320). The network stack (320) provides networking services to the application(s) (310), implementing one or more networking protocols (e.g., TCP/IP, UDP/IP, or other combinations of transport protocols and network protocols). The network stack (320) is bound to a host virtual network adapter (330). For example, the host virtual network adapter (330) is a host virtual NIC.

The host virtual network adapter (330) runs in the host partition. When the virtual switch (350) connects to an external network, the host virtual network adapter (330) can be bound to the host physical network adapter (360). In this configuration, the host virtual network adapter (330) mimics the host physical network adapter (360) and forwards packets to and from the host physical network adapter (360) or one of the VM network adapters (331 . . . 33n) through the virtual switch (350). Alternatively, the host virtual network adapter (330) can be bound to an intermediate driver (e.g., NDIS multiplexer), which is bound to a team of one or more physical network adapters, represented by the host physical network adapter (360). In this configuration, extensions to the virtual switch (350) are exposed to every network adapter in the team, and can potentially manage the network adapters in the team. When the virtual switch (350) does not connect to an external network, the host virtual network adapter (330) is not bound to the host physical network adapter (360), but can still be used to forward packets to and from one of the VM network adapters (331 . . . 33n) through the virtual switch (350).

In the host partition, one or more other host services, processes, and/or agents (339) run. For example, one or more service managers that run in the host partition can be configured to perform operations to configure the virtual networking layer—loading the virtual switch proxy (340) (e.g., as a boot driver), loading the virtual switch (350) (e.g., as an autostart driver), registering the virtual switch (350) with the virtual switch proxy (340), and creating connections between the virtual switch (350) and VMs. The service manager(s) can be host OS components. For additional details about example operations to configure the virtual networking layer, see section V.

As another example, an orchestration agent that runs in the host partition can be configured to perform operations to service the virtual switch (350). The orchestration agent can run a script that specifies the operations to service the virtual switch (350). Depending on implementation, various agents, engines, etc. can run the script. For additional details about example operations to service the virtual switch (350), see section VI.

As another example, a virtual machine management service, hypervisor networking services agent, or other control agent can run in the host partition. In general, such a service/agent controls the behavior of the VMs and other aspects of virtualization.

One or more applications (311 . . . 31n) run in each of the guest partitions. The application(s) (311 . . . 31n) can include an arbitrary application. In each of the guest partitions, the application(s) (311 . . . 31n) are bound to a network stack (321 . . . 32n), which provides networking services to the application(s) (311 . . . 31n), implementing one or more networking protocols (e.g., TCP/IP, UDP/IP, or other combinations of transport protocols and network protocols). In each of the guest partitions, the network stack (321 . . . 32n) is bound to a VM network adapter (331 . . . 33n). For example, the VM network adapter (331 . . . 33n) is a VM NIC. In each of the guest partitions, the VM network adapter (331 . . . 33n) is exposed in the guest OS that runs in the guest partition. The VM network adapter (331 . . . 33n) can emulate a physical network adapter to forward packets to and from a port of the virtual switch (350), e.g., over a VM bus channel. A VM network adapter can be configured to access the virtual switch (350), whether the virtual switch (350) is configured to operate as an external virtual switch, internal virtual switch, or private virtual switch.

The virtual switch proxy (340) is a thin software layer that executes in the host partition. On behalf of the virtual switch (350), the virtual switch proxy (340) manages network adapters that connect to ports of the virtual switch (350) (e.g., VM network adapters, host virtual network adapter). For each of the VM(s), the virtual switch proxy (340) is configured to mediate transfers of data over a connection, through one of the VM network adapters (331 . . . 33n), between the VM and the virtual switch (350). (As the virtual switch proxy (340) mediates the data transfers, the data need not actually pass through the virtual switch proxy (340).) For example, the connection between the VM and the virtual switch (350) uses a channel between the virtual switch (350) and the VM.

In some example implementations, the virtual switch proxy (340) is loaded as a driver and registers itself in the system as a virtual switch. The virtual switch proxy (340) runs as part of kernel mode. Other components (e.g., running in user mode) may send input/output control ("IOCTL") calls to the virtual switch proxy (340), which is registered in the system as a virtual switch, and the virtual switch proxy (340) conveys the IOCTL calls to the virtual switch (350) if the virtual switch (350) is registered. (Before the virtual switch (350) is registered, or during virtual switch servicing, the virtual switch proxy (340) can ignore the IOCTL calls.) Alternatively, after the virtual switch (350) is registered, the virtual switch proxy (340) can delegate the handling of IOCTL calls to another entity.

However it has been loaded, the virtual switch proxy (340) remains loaded in memory during virtual switch servicing, maintaining presence of the network interface and preserving network connections for applications running in the host partition and guest partitions. During virtual switch servicing, a network stack (321 . . . 32n) in a guest partition can remain bound to the VM network adapter (331 . . . 33n) in the guest partition. The virtual switch proxy (340) is configured to, for each of the VM(s), persist state information, which defines features of the connection through the VM network adapter (331 . . . 33n) for the VM, when changing versions of the virtual switch. This facilitates maintenance of apparent connectivity for the VM over the connection through the VM network adapter (331 . . . 33n). For example, the virtual switch proxy (340) can be configured to save and retrieve state information for the VM network adapter of the connection. Such state information can be used to restore state of the VM network adapter. As another example, the virtual switch proxy (340) can be configured to save and retrieve state information for a channel between the virtual switch and the VM. Such state information can be used to restore state of the channel. In this way, the VMs can continue to run during virtual switch servicing.

The virtual switch (350) also executes in the host partition. The virtual switch (350) is configured to transfer data between multiple ports of the virtual switch. For example, the virtual switch (350) can operate as described in section III.A. The virtual switch (350) can connect to the virtual switch proxy (340) through one or more private interfaces.

The host physical network adapter (360) is connected to an external network, and can represent a single network adapter, a network switch, or a team of network adapters. The host physical network adapter (360) can also be connected to a port of the virtual switch (350). The host physical network adapter (360) can be bound to the host virtual network adapter (330). Or, if the host physical network adapter (360) represents a team of network adapters, the host virtual network adapter (330) can be bound to an intermediate driver, which is bound to the host physical network adapter (360) (representing the team).

Figure 3A:
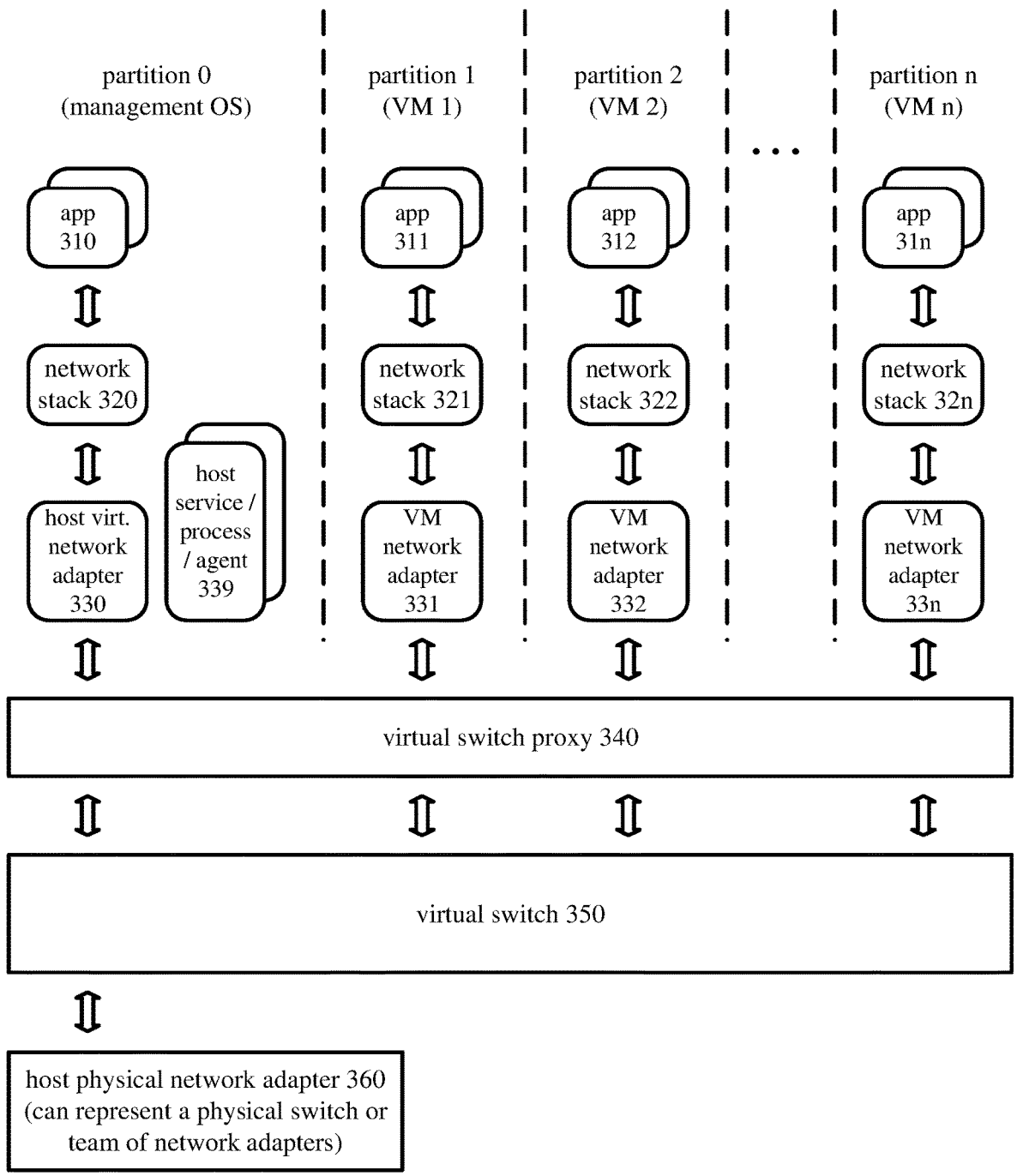

In the example architecture (301) of FIG. 3a, the virtual switch proxy (340) is also configured to, for a host connected to the virtual networking layer, mediate transfers of data over a connection, through the host virtual network adapter (330), between the host and the virtual switch (350). (As the virtual switch proxy (340) mediates the data transfers, the data need not actually pass through the virtual switch proxy (340).) The virtual switch proxy (340) persists state information, which defines features of the connection through the host virtual network adapter (330), when changing the versions of the virtual switch (350). This facilitates maintenance of apparent connectivity for the host over the connection through the host virtual network adapter (330). For example, the virtual switch proxy (340) can be configured to save and retrieve state information for the host virtual network adapter of the connection. Such state information can be used to restore state of the host virtual network adapter. As another example, the virtual switch proxy (340) can be configured to save and retrieve state information for the host physical network adapter (360). Such state information can be used to restore state of the host physical network adapter (360). In contrast, in the example architecture (302) of FIG. 3b, a different component mediates transfers of data over a connection between the host and a virtual switch, and persists state information that defines features of the connection when changing the versions of the virtual switch.

In the example architecture (301) of FIG. 3a, the host partition and guest partitions all connect to the same virtual switch (350) for the same host physical network adapter (360). Alternatively, different partitions can connect to different virtual switches, and each virtual switch can be for a different host physical network adapter or have no host physical network adapter. A given partition can be connected to multiple different virtual switches.

C. Example Virtual Networking Layer with a Virtual Switch Proxy and Host Network Adapter Proxy.

This section describes an example architecture that includes a virtual networking layer with a virtual switch proxy and a host network adapter proxy. In the example architecture (302) of FIG. 3b, the virtual switch (350) supports networking operations for a host and multiple VMs, which run in different partitions. The host runs in partition 0, and the VMs run in partitions 1 . . . n, respectively.

One or more applications (310) run in the host partition and are bound to a network stack (320), as described with reference to the example architecture (301) of FIG. 3a. The network stack (320) is bound to a host network adapter proxy (349).

The host network adapter proxy (349) is a proxy for the host virtual network adapter (351), which is implemented as part of the virtual switch (352). In some example implementations, the host virtual network adapter (351) and the virtual switch (352) are part of the same binary file. When the virtual switch (352) connects to an external network, the host virtual network adapter (351) can be bound to the host physical network adapter (360). In this configuration, the host virtual network adapter (351) mimics the host physical network adapter (360) and forwards packets to and from the host physical network adapter (360) or one of the VM network adapters (331 . . . 33n) through the virtual switch (352). Alternatively, the host virtual network adapter (351) can be bound to an intermediate driver (e.g., NDIS multiplexer), which is bound to a team of one or more physical network adapters, represented by the host physical network adapter (360). In this configuration, extensions to the virtual switch (352) are exposed to every network adapter in the team, and can potentially manage the network adapters in the team. When the virtual switch (352) does not connect to an external network, the host virtual network adapter (351) is not bound to the host physical network adapter (360), but can still be used to forward packets to and from one of the VM network adapters (331 . . . 33n) through the virtual switch (352).

In the host partition, one or more other host services, processes, and/or agents (339) run. For example, one or more service managers that run in the host partition can be configured to perform operations to configure the virtual networking layer—loading the virtual switch proxy (341) and the host network adapter proxy (349) (e.g., as boot drivers), loading the virtual switch (352) (e.g., as an auto-start driver), registering the virtual switch (352) with the virtual switch proxy (340), registering the virtual switch (352) with the host network adapter proxy (349), and creating connections between the virtual switch (352) and VMs. The service manager(s) can be host OS components. For additional details about example operations to configure the virtual networking layer, see section V. Or, as another example, the other host services, processes, and/or agents (339) include an orchestration agent, which can perform operations to service the virtual switch (352) as described in section VI.

Each of the guest partitions 1 . . . n includes one or more applications (311 . . . 31n), a network stack (321 . . . 32n), and a VM network adapter (331 . . . 33n), as described with reference to the example architecture (301) of FIG. 3a.

The virtual switch proxy (341) is a thin software layer that executes in the host partition. On behalf of the virtual switch (352), the virtual switch proxy (341) manages network adapters that connect to ports of the virtual switch (352) (e.g., VM network adapters). For each of the VM(s), the virtual switch proxy (341) is configured to mediate transfers of data over a connection, through one of the VM network adapters (331 . . . 33n), between the VM and the virtual switch (352). (As the virtual switch proxy (341) mediates the data transfers, the data need not actually pass through the virtual switch proxy (341).) For example, the connection between the VM and the virtual switch (352) uses a channel between the virtual switch (352) and the VM.

In some example implementations, the virtual switch proxy (341) is loaded as a driver and registers itself in the system as a virtual switch. The virtual switch proxy (341) runs as part of kernel mode. Other components (e.g., running in user mode) may send IOCTL calls to the virtual switch proxy (341), which is registered in the system as a virtual switch, and the virtual switch proxy (341) conveys the IOCTL calls to the virtual switch (352) if the virtual switch (352) is registered. (Before the virtual switch (352) is registered, or during virtual switch servicing, the virtual switch proxy (341) can ignore the IOCTL calls.) Alternatively, after the virtual switch (352) is registered, the virtual switch proxy (341) can delegate the handling of IOCTL calls to another entity.

However it has been loaded, the virtual switch proxy (341) remains loaded in memory during virtual switch servicing, maintaining presence of the network interface and preserving network connections for applications running in the guest partitions. During virtual switch servicing, a network stack (321 . . . 32n) in a guest partition can remain bound to the VM network adapter (331 . . . 33n) in the guest partition. The virtual switch proxy (341) is configured to, for each of the VM(s), persist state information, which defines features of the connection through the VM network adapter (331 . . . 33n) for the VM, when changing versions of the virtual switch, as described with reference to the virtual switch proxy (340) of FIG. 3a. This facilitates maintenance of apparent connectivity for the VM over the connection through the VM network adapter (331 . . . 33n). In this way, the VMs can continue to run during virtual switch servicing.

The virtual switch (352) also executes in the host partition. The virtual switch (352) is configured to transfer data between multiple ports of the virtual switch. For example, the virtual switch (352) can operate as described in section III.A. The virtual switch (352) can also connect to the virtual switch proxy (341) through one or more private interfaces. The virtual switch (352) can connect to the host network adapter proxy (349) through one or more private interfaces.

The host network adapter proxy (349) is another thin software layer that executes in the host partition. On behalf of the virtual switch (352), the host network adapter proxy (349) manages a network adapter (e.g., the host virtual network adapter). For the host, the host network adapter proxy (349) is configured to mediate transfers of data over a connection, through the host virtual network adapter (351), between the host and the virtual switch (352). (As the host network adapter proxy (349) mediates the data transfers, the data need not actually pass through the host network adapter proxy (349).)

In some example implementations, the host network adapter proxy (349) is loaded as a driver and registers itself in the system as a miniport driver on behalf of the virtual switch (352). The host network adapter proxy (349) runs as part of kernel mode. The host network adapter proxy (349) helps preserve state information for the host virtual network adapter (351) and corresponding host physical network adapter (360) during virtual switch servicing.

However it has been loaded, the host network adapter proxy (349) remains loaded in memory during virtual switch servicing, maintaining presence of the network interface and preserving network connections for applications running in the host partition. During virtual switch servicing, the network stack (320) in the host partition can remain bound to the host network adapter proxy (349). The host network adapter proxy (349) is configured to, for the host, persist state information, which defines features of the connection through the host virtual network adapter (351) for the host when changing versions of the virtual switch. This facilitates maintenance of apparent connectivity for the host over the connection through the host virtual network adapter (351). For example, the host network adapter proxy (349) can be configured to save and retrieve state information for the host virtual network adapter (351) of the connection. Such state information can be used to restore state of the host virtual network adapter (351). As another example, the host network adapter proxy (349) can be configured to save and retrieve state information for the host physical network adapter (360). Such state information can be used to restore state of the host physical network adapter (360). In this way, the host can continue to run during virtual switch servicing.

The host physical network adapter (360) is connected to an external network, and can represent a single network adapter, a network switch, or a team of network adapters, as described with reference to the example architecture (301) of FIG. 3a.

Figure 3B:
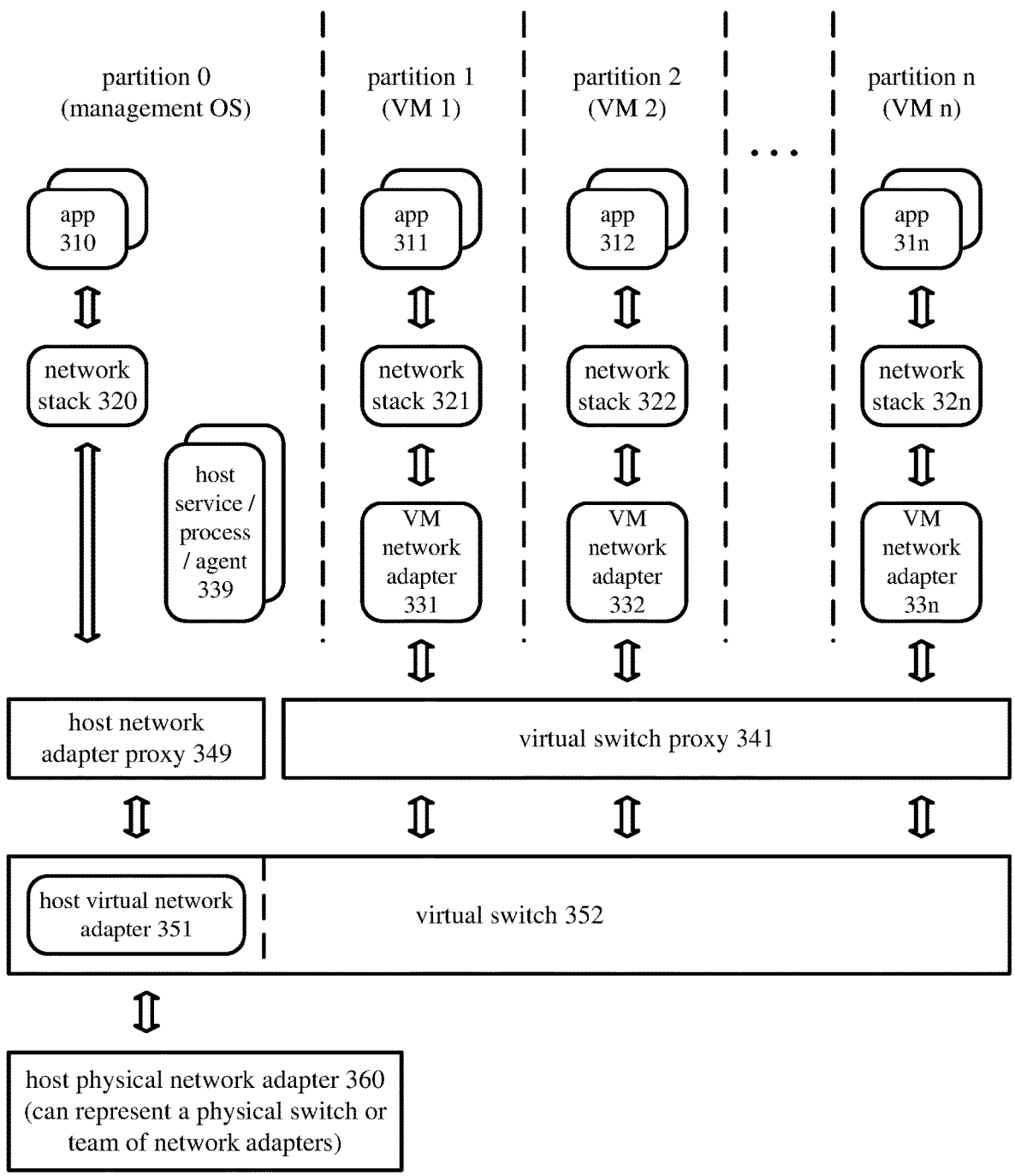

In the example architecture (302) of FIG. 3b, the host partition and guest partitions all connect to the same virtual switch (352) for the same host physical network adapter (360). Alternatively, different partitions can connect to different virtual switches, and each virtual switch can be for a different host physical network adapter or have no host physical network adapter. A given partition can be connected to multiple different virtual switches.

D. Example Architectures and Interfaces for a Virtual Networking Layer with a Virtual Switch Proxy and Host Network Adapter Proxy.

This section describes another example architecture and interfaces for a virtual networking layer with a virtual switch proxy and host network adapter proxy. In the example architecture (400) of FIG. 4, the virtual switch (441) supports networking operations for a host and multiple VMs, which run in different partitions. The host runs in partition 0, and the VMs run in partitions 1 . . . n, respectively. For the sake of simplicity, one partition (partition n) is shown in FIG. 4, but the example architecture (400) can be extended to an arbitrary number of partitions like partition n.

One or more applications (410) run in the host partition. The application(s) (410) can include a monitoring agent, a diagnostic application, and/or an application that checks for activity of applications in the host and guest partitions, which reports "liveliness" updates to a central server. The application(s) (410) can also include another arbitrary application.

The application(s) (410) are bound to a network stack (420). The network stack (420) provides networking services to the application(s) (410), implementing one or more networking protocols (e.g., TCP/IP, UDP/IP, or other combinations of transport protocols and network protocols). The network stack (420) is bound to a host network adapter proxy (432).

In the host partition, one or more other host services, processes, and/or agents run. For example, a virtual machine management service ("VMMS") (429), hypervisor networking services agent, or other control agent can run in the host partition. In general, such a service/agent controls the behavior of the VMs and other aspects of virtualization. The host partition includes a VM worker process ("VMWP") (428) for each VM, which manages various aspects of the VM. The VMWP (428) starts a virtual motherboard and virtual BIOS for the VM. For a connection between the virtual switch (441) and VM, the VMWP (428) starts a network VSC (44n) in the guest partition for the VM.

As another example, one or more service managers that run in the host partition can be configured to perform operations to configure the virtual networking layer—loading the virtual switch proxy (430) and the host network adapter proxy (432) (e.g., as boot drivers), loading the virtual switch (441) (e.g., as an autostart driver), registering the virtual switch (441) with the virtual switch proxy (430), registering the virtual switch (441) with the host network adapter proxy (432), and creating connections between the virtual switch (441) and VMs. The service manager(s) can be host OS components. For additional details about example operations to configure the virtual networking layer, see section V.

As another example, an orchestration agent (427) that runs in the host partition can be configured to perform operations to service the virtual switch (441). The orchestration agent can run a script that specifies the operations to service the virtual switch (441). Depending on implementation, various agents, engines, etc. can run the script. For additional details about example operations to service the virtual switch (441), see section VI.

One or more applications (41n) run in the guest partition n. The application(s) (41n) can include an arbitrary application. In the guest partition n, the application(s) (41n) are bound to a network stack (42n), which provides networking services to the application(s) (41n), implementing one or more networking protocols (e.g., TCP/IP, UDP/IP, or other combinations of transport protocols and network protocols). In the guest partition n, the network stack (42n) is bound to a VM network adapter (43n). For example, the VM network adapter (43n) is a VM NIC. The VM network adapter (43n) is exposed in the guest OS that runs in the guest partition. The VM network adapter (43n) can emulate a physical network adapter to forward packets to and from a port of the virtual switch (441), e.g., over a VM bus channel (46n). The VM network adapter can be configured to access the virtual switch (441), whether the virtual switch (441) is configured to operate as an external virtual switch, internal virtual switch, or private virtual switch.

The network VSC (44n) runs in the guest OS of the guest partition n. The network VSC (44n) exposes the VM network adapter (43n) to guest software in the VM n. By default, the network VSC (44n) connects to a port of the virtual switch (441) in order to send packets to the virtual switch (441) or receive packets from the virtual switch (441). Specifically, the network VSC (44n) connects to the virtual switch (441) over a VM bus channel (46n) to a network virtual service provider ("VSP"). The network VSP runs in the host partition and includes the virtual switch (441), thereby providing services to support networking access by the VMs in the guest partitions. In this way, the network VSC (44n) can deliver packets to the host, to another VM, or to an external network. (In an alternative mode, the network VSC (44n) can connect to a virtual function of a host physical network adapter (470), and send/receive packets directly over the physical network adapter (470). In this alternative mode, a NIC switch on the physical network adapter (470) can bridge network traffic between virtual functions and the adapter's physical network interface.)

The channel client library (465) provides services to the network VSP and network VSC (44n) to create a VM bus channel A VM bus channel is a virtual communication bus that passes control and data messages between the host partition and a guest partition. Specifically, the VM bus channel passes control and data messages between the network VSP of the host partition and the network VSC of the guest partition. FIG. 4 shows a VM bus channel (46n) between the virtual switch proxy (441), for the network VSP in the host partition, and the network VSC (44n) in the guest partition n. A different VM bus channel can similarly pass control and data messages between the host partition and each other guest partition.

The channel client library (465) exposes a callback interface that can be called to mediate transfers of data over a VM bus channel. For example, the callback interface exposed by the channel client library (465) is a public interface. Functions of the callback interface can be called by wrapper functions implemented in the virtual switch proxy (430), as defined in FIGS. 6c and 6d. Function pointers to the functions can be provided to the virtual switch proxy (430) when the virtual switch (441) registers with the virtual switch proxy (see FIGS. 6e and 6h). To mediate transfers of data over the connection between the virtual switch (441) and VM n, the virtual switch proxy (430) can be configured to call target functions of the callback interface implemented by the channel client library (465). Function pointers to the target functions of the callback interface implemented by the channel client library (465) can be persisted when changing versions of the virtual switch (441). The target functions of the callback interface implemented by the channel client library (465) can also be called from the network VSC (44n).

The virtual switch proxy (430) is a thin software layer that executes in the host partition. On behalf of the virtual switch (441), the virtual switch proxy (430) manages network adapters that connect to ports of the virtual switch (441) (e.g., VM network adapters). For the VM n, the virtual switch proxy (430) is configured to mediate transfers of data over a connection, through the VM network adapter (43n), between the VM and the virtual switch (441). (As the virtual switch proxy (430) mediates the data transfers, the data need not actually pass through the virtual switch proxy (430).) In FIG. 4, the connection between the VM n and the virtual switch (441) uses the VM bus channel (46n).

In some example implementations, the virtual switch proxy (430) is loaded as a driver and registers itself in the system as a virtual switch. The virtual switch proxy (430) runs as part of kernel mode. Other components (e.g., running in user mode) may send IOCTL calls to the virtual switch proxy (430), which is registered in the system as a virtual switch, and the virtual switch proxy (430) conveys the IOCTL calls to the virtual switch (441) if the virtual switch (441) is registered. (Before the virtual switch (441) is registered, or during virtual switch servicing, the virtual switch proxy (430) can ignore the IOCTL calls.) Alternatively, after the virtual switch (441) is registered, the virtual switch proxy (430) can delegate the handling of IOCTL calls to another entity.

However it has been loaded, the virtual switch proxy (430) remains loaded in memory during virtual switch servicing, maintaining presence of the network interface and preserving network connections for applications running in guest partitions. During virtual switch servicing, the network stack (42n) in guest partition n can remain bound to the VM network adapter (43*n*) in the guest partition. The virtual switch proxy (430) is configured to, for each of the VM(s), persist state information, which defines features of the connection through the VM network adapter (43*n*) for the VM, when changing versions of the virtual switch (441). This facilitates maintenance of apparent connectivity for the VM over the connection through the VM network adapter (43*n*). For example, the virtual switch proxy (430) can be configured to save and retrieve state information for the VM network adapter (43*n*) of the connection. Such state information can be used to restore state of the VM network adapter (43*n*). As another example, the virtual switch proxy (430) can be configured to save and retrieve state information for the VM bus channel (46*n*) between the virtual switch (441) and the network VSC (44*n*) for the VM. Such state information can be used to restore state of the VM bus channel (46*n*). In this way, the VM n can continue to run during virtual switch servicing.

The virtual switch (441) also executes in the host partition. The virtual switch (441) is configured to transfer data between multiple ports of the virtual switch. For example, the virtual switch (441) can operate as described in section III.A. The virtual switch (441) incorporates one or more extensions (449), which can operate as described in section III.A. The virtual switch (441) can connect to the virtual switch proxy (430) through one or more private interfaces.

For example, the virtual switch proxy (430) can implement functions of a callback interface that the virtual switch (441) can call, as shown in FIG. 6*f*. The virtual switch proxy (430) can provide function pointers for such functions to the virtual switch (441) when the virtual switch (441) registers with the virtual switch proxy (430), as shown in FIGS. 6*g* and 6*i*. For example, the functions can include: (a) a function to unregister the virtual switch (441) from the virtual switch proxy (430), (b) a function to set a servicing state for the virtual switch (441), (c) a function to get the servicing state for the virtual switch (441), (d) a function to request channel allocation, (e) a function to request channel clean up, and/or (f) a function to provide channel callbacks. The virtual switch proxy (430) can also implement wrapper functions (see FIGS. 6*c*-6*d*) that call target functions of a callback interface implemented by the channel client library (465). Alternatively, the virtual switch proxy (430) can implement other functions and/or additional functions of a callback interface that the virtual switch (441) can call.

As another example, the virtual switch (441) can implement functions of a callback interface that the virtual switch proxy (430) can call, as shown in FIG. 6*b*. The virtual switch (441) can provide function pointers for such functions to the virtual switch proxy (430) when the virtual switch (441) registers with the virtual switch proxy (430), as shown in FIGS. 6*e* and 6*h*. For example, the functions can include, for a device associated with the host physical network adapter (470): (a) a function to request handler creation, (b) a function to request handler closing, (c) a function to request a read operation, (d) a function to request a write operation, and/or (e) a function to request an internal device control operation. Alternatively, the virtual switch (441) can implement other functions and/or additional functions of a callback interface that the virtual switch proxy (430) can call.

The host network adapter proxy (432) is another thin software layer that executes in the host partition. On behalf of the virtual switch (441), the host network adapter proxy (432) manages the host virtual network adapter (442). The host network adapter proxy (432) is a proxy for the host virtual network adapter (442), which is implemented as part of the virtual switch (441). In some example implementations, the host virtual network adapter (442) and the virtual switch (441) are part of the same binary file. When the virtual switch (441) connects to an external network, the host virtual network adapter (442) can be bound to the host physical network adapter (470). In this configuration, the host virtual network adapter (442) mimics the host physical network adapter (470) and forwards packets to and from the host physical network adapter (470) or a VM network adapter (43*n*) through the virtual switch (441). Alternatively, the host virtual network adapter (442) can be bound to an intermediate driver (e.g., NDIS multiplexer), which is bound to a team of one or more physical network adapters, represented by the host physical network adapter (470). In this configuration, extensions (449) to the virtual switch (441) are exposed to every network adapter in the team, and can potentially manage the network adapters in the team. When the virtual switch (441) does not connect to an external network, the host virtual network adapter (442) is not bound to the host physical network adapter (470), but can still be used to forward packets to and from the VM network adapter (43*n*) through the virtual switch (441). For the host, the host network adapter proxy (432) is configured to mediate transfers of data over a connection, through the host virtual network adapter (442), between the host and the virtual switch (441). (As the host network adapter proxy (432) mediates the data transfers, the data need not actually pass through the host network adapter proxy (432).)

In some example implementations, the host network adapter proxy (432) is loaded as a driver and registers itself in the system as a miniport driver on behalf of the virtual switch (441). The host network adapter proxy (432) runs as part of kernel mode. The host network adapter proxy (432) helps preserve state information for the host virtual network adapter (441) and corresponding host physical network adapter (470) during virtual switch servicing.

However it has been loaded, the host network adapter proxy (432) remains loaded in memory during virtual switch servicing, maintaining presence of the network interface and preserving network connections for applications running in the host partition. During virtual switch servicing, the network stack (420) in the host partition can remain bound to the host network adapter proxy (432). The host network adapter proxy (432) is configured to, for the host, persist state information, which defines features of the connection through the host virtual network adapter (442) for the host, when changing versions of the virtual switch (441). This facilitates maintenance of apparent connectivity for the host over the connection through the host virtual network adapter (442). For example, the host network adapter proxy (432) can be configured to save and retrieve state information for the host virtual network adapter (442) of the connection. Such state information can be used to restore state of the host virtual network adapter (442). As another example, the host network adapter proxy (432) can be configured to save and retrieve state information for the host physical network adapter (470). Such state information can be used to restore state of the host physical network adapter (470). In this way, the host can continue to run during virtual switch servicing.

The virtual switch (441) can connect to the host network adapter proxy (432) through one or more private interfaces. For example, the host network adapter proxy (432) can implement functions of a callback interface that the virtual switch (441) can call, as shown in FIGS. 5*b*-5*c*. The host network adapter proxy (432) can provide function pointers for such functions to the virtual switch (441) when the virtual switch (441) registers with the host network adapter proxy (432), as shown in FIG. 5*e*. For example, the functions can include: (a) a function to unregister the virtual switch (441) from the host network adapter proxy (432), (b) a function to unload a host physical network adapter driver (460), (c) a function to check whether the host physical network adapter driver (460) has been reloaded, (d) a function to save configuration information for the host physical network adapter driver (460), and/or (e) a function to retrieve configuration information for the host physical network adapter driver (460). The host network adapter proxy (432) can also implement wrapper functions (see FIGS. 5b-5c) that call target functions of a callback interface implemented by the host physical network adapter driver (460), e.g., target functions to set attributes, initialize a network interface, or start a network interface. Alternatively, the host network adapter proxy (432) can implement other functions and/or additional functions of a callback interface that the virtual switch (441) can call.

The host physical network adapter driver (460) implements functions to manage the host physical network adapter (470). For example, the host physical network adapter driver (460) is a miniport driver that controls the host physical network adapter (470). The host physical network adapter driver (460) can implement NDIS functions, which are called by wrapper functions of the host network adapter proxy (432) when the wrapper functions of the host network adapter proxy (432) are called.

The host physical network adapter (470) is connected to an external network, and can represent a single network adapter, a network switch, or a team of network adapters. The host physical network adapter (470) can also be connected to a port of the virtual switch (441). The host physical network adapter (470) can be bound to the host virtual network adapter (442). Or, if the host physical network adapter (470) represents a team of network adapters, the host virtual network adapter (442) can be bound to an intermediate driver, which is bound to the host physical network adapter (470) (representing the team).

IV. Example Functions and Interfaces.

This section describes example functions called to register a virtual switch with a virtual switch proxy and host network adapter proxy in some example implementations. It also describes example functions implemented by the virtual switch, virtual switch proxy, and host network adapter proxy in those example implementations, as well as example functions called by the virtual switch, virtual switch proxy, and host network adapter proxy.

A function can be any routine, method, or other set of operations that accepts, from a caller, zero or more input parameters and returns, to the caller, zero or more output parameters. A function pointer can be a reference to a memory address or any other type of reference to an entry point for a function. A wrapper function holds a function pointer to another function—the target function. When the wrapper function is called, the wrapper function in turn calls the target function, passing the same parameters that the wrapper function received. In some example implementations, a virtual switch proxy and host network adapter proxy are relatively "thin" layers of software that implement some functions for virtual switch servicing but also provide shimming functionality. The virtual switch proxy includes wrapper functions that in turn call target functions of a channel client library. The host network adapter proxy includes wrapper functions that in turn call target functions of a host physical network adapter driver. Before function pointers to the target functions are provided, any calls to the wrapper function are ignored. After function pointers to the target functions are provided (e.g., when the virtual switch is registered), calls to the wrapper functions are handled correctly through the target functions.

A. Interfaces Between Virtual Switch and Host Network Adapter Proxy.

FIGS. 5a-5e show listings (501-505) of function prototypes, parameters used in registration, and other structures for a virtual switch and a host network adapter proxy, which acts as a proxy for a host physical network adapter. The different listings (501-505) can be part of a header file that contains types and definitions shared between the virtual switch and host network adapter proxy.

The listing (501) in FIG. 5a shows an input/output control ("IOCTL") call used to register the virtual switch (vmswitch) with the host network adapter proxy. The listing (504) in FIG. 5d shows input parameters supplied by the virtual switch when the virtual switch registers with the host network adapter proxy. The input parameters include characteristics of a host physical network adapter driver (specifically, an NDIS miniport driver) for which the host network adapter proxy will act as a shim layer.

The listing (505) in FIG. 5e shows output parameters returned to the virtual switch when the virtual switch registers with the host network adapter proxy. The output parameters include handle identifiers and function pointers. The handle identifiers identify a host physical network adapter driver (NDIS miniport driver) associated with the host network adapter proxy. The function pointers reference functions of a callback interface that the host network adapter proxy implements, as defined in FIGS. 5b and 5c.

The listings (502-503) in FIGS. 5b and 5c show function prototypes for functions implemented by the host network adapter proxy as part of a callback interface. Using function pointers it received when registering with the host network adapter proxy, the virtual switch can call the functions of the callback interface. Some function prototypes shown in the listings (502-503) are for "control" functions, which the virtual switch can call for various reasons. For example, the virtual switch can call the function associated with VMS_NIC_PROXY_MINIPORT_RELOADED to check whether a host physical network adapter driver (specifically, a NDIS miniport driver) is reloaded. The virtual switch can call the function associated with VMS_NIC_PROXY_CONFIG_SAVE to save configuration information for a host physical network adapter driver (and hence host physical network adapter). In particular, this function can be called to store configuration information for a host physical network adapter driver (and host physical network adapter) during virtual switch servicing, so that the information is retained. The virtual switch can call the function associated with VMS_NIC_PROXY_CONFIG_RESTORE to restore the configuration for a host physical network adapter driver (and host physical network adapter) using previously saved configuration information. In particular, this function can be called to retrieve configuration information and restore the configuration for a host physical network adapter driver (and host physical network adapter) during virtual switch servicing. The virtual switch can call the function associated with VMS_NIC_PROXY_MINIPORT_UNLOAD to unload a host physical network adapter driver. Finally, the virtual switch can call the function associated with VMS_NIC_PROXY_UNREGISTER to unregister the virtual switch from the host network adapter proxy.

Other function prototypes shown in the listings (502-503) are for "wrapper" functions implemented by the host network adapter proxy, which in turn call corresponding target functions of another component (e.g., NDIS functions of a host physical network adapter driver) when called from the virtual switch. For example, a virtual switch (e.g., through a host virtual network adapter implemented as part of the virtual switch) can call a wrapper function implemented by the host network adapter proxy in response to a call from a protocol driver in a network stack. The wrapper function in turn calls a corresponding target function, using the input parameters for the wrapper function as the input parameters for the corresponding target function. For example, a wrapper function and corresponding target function can be called to set the attributes of a host physical network adapter driver (and hence host physical network adapter). Or, a wrapper function and corresponding target function can be called to indicate status, initialize a device instance, set optional handlers, or process a notification event for a host physical network adapter driver (and hence host physical network adapter). Or, a wrapper function and corresponding target function can be called to initialize, start, or uninitialize a host physical network adapter driver (and hence host physical network adapter).

As it proxies calls to target functions, the host network adapter proxy can save information about a host virtual network adapter associated with the host physical network adapter, so that the information is retained during virtual switch servicing. Alternatively, such information about the host virtual network adapter can be saved with calls to the host network adapter proxy at the time of virtual switch servicing.

B. Interface Between Virtual Switch and Virtual Switch Proxy.

FIGS. 6a-6i show listings (601-609) of function prototypes, parameters used in registration, and other structures for a virtual switch and a virtual switch proxy, which acts as a proxy for the virtual switch. The different listings (601-609) can be part of a header file that contains types and definitions shared between the virtual switch and virtual switch proxy.

The listing (601) of FIG. 6a shows header files that can be incorporated. The listing (607) in FIG. 6g shows an IOCTL call used to register the virtual switch (vmswitch) with the virtual switch proxy. The listing (608) in FIG. 6h shows input parameters supplied by the virtual switch when the virtual switch registers with the virtual switch proxy. The input parameters include pointers to context information and a driver object for the virtual switch, as well as function pointers to functions of a callback interface implemented by the virtual switch and function pointers to functions of a callback interface implemented by a channel client library (specifically, the VMBus kernel mode client library). The listing (605) in FIG. 6e shows the function pointers provided by the virtual switch when the virtual switch registers with the virtual switch proxy.

The listing (609) in FIG. 6i shows output parameters returned to the virtual switch when the virtual switch registers with the virtual switch proxy. The output parameters include a pointer to context information for the virtual switch proxy as well as function pointers to functions of a callback interface implemented by the virtual switch proxy. The function table at the end of the listing (606) in FIG. 6f shows the function pointers provided by the virtual switch proxy when the virtual switch registers with the virtual switch proxy.

The listing (602) in FIG. 6b shows function prototypes for functions implemented by the virtual switch as part of a callback interface. Using function pointers it received when registering the virtual switch (see FIGS. 6e, 6g, and 6h), the virtual switch proxy can call the functions of the callback interface. The function prototypes shown in the listing (602) are for "control" functions, which the virtual switch proxy can call to create a handler for a device, close a handler for a device, request that a device read from a specified buffer, request that a device write to a specified buffer, or convey some internal device control request. For the five functions associated with the function prototypes shown in FIG. 6b the input parameter DeviceObject is a caller-supplied pointer to a structure for a device object. The input parameter Irp is a caller-supplied pointer to a structure that indicates the requested operation. The Irp structure includes a pointer to a buffer (e.g., an empty buffer for a read operation, or a buffer storing data for a write operation), flags, and other parameters. Specifically, in the virtual switch, the function associated with VMSWITCH_CREATE_HANDLER is a dispatch for IRP_MJ_CREATE, and the function associated with VMSWITCH_CLOSE_HANDLER is a dispatch for IRP_MJ_CLOSE. The function associated with VMSWITCH_READ_HANDLER is a dispatch for IRP_MJ_READ, which is a code in a request to read data from the device object. For this function, the virtual switch can transfer data from the device object to memory (e.g., for a VM bus channel). The function associated with VMSWITCH_WRITE_HANDLER is a dispatch for IRP_MJ_WRITE, which is a code in a request to write data to the device object. For this function, the virtual switch can transfer data to the device object from memory (e.g., for a VM bus channel). Finally, the function associated with VMSWITCH_IOCTRL_HANDLER handles internal device control requests.

Alternatively, the virtual switch proxy can pass function pointers to the functions defined in FIG. 6b to another entity, which may call the functions of the callback interface implemented by the virtual switch. Or, the virtual switch proxy can wrap the function pointers in wrapper functions implemented in the virtual switch proxy, which another entity calls.

The listings (603-604) in FIGS. 6c and 6d relate to shimming for data transfer. The listings (603-604) show function prototypes for wrapper functions implemented in the virtual switch proxy, which in turn call corresponding target functions of a callback interface implemented by a channel client library (e.g., a kernel mode client library for VM bus channels). Function pointers to the target functions of the callback interface of the channel client library are provided to the virtual switch proxy by the virtual switch (see FIG. 6e, 6g, 6h) when the virtual switch registers with the virtual switch proxy. Wrapper functions are defined in the virtual switch proxy, and may be called to use or change the status of a channel between the virtual switch and a VM (specifically, a VM bus channel between a network VSP for the virtual switch and a network VSC for the VM). A wrapper function calls a corresponding target function, using the input parameters for the wrapper function as the input parameters for the corresponding target function. Function pointers to the target functions of the callback interface of the channel client library can also be provided to a VM client (e.g., a network VSC for a VM), which may call the functions to use or change the status of the channel (specifically, VM bus channel).

In the virtual switch proxy, the wrapper function associated with VMSWITCH_VMNICPVT_KMCL_CHANNELOPENED corresponds to a target function associated with EVT_VMB_CHANNEL_OPENED in the channel client library. This target function is called when a client endpoint in a guest VM opens a channel which has been offered to it. For the wrapper function, the input parameter (VmbChannel) indicates the channel that the guest VM opens.

In the virtual switch proxy, the wrapper function associated with VMSWITCH_VMNICPVT_KMCL_CHANNEL-CLOSED corresponds to a target function associated with EVT_VMB_CHANNEL_CLOSED in the channel client library. This target function is called when a client endpoint in a guest VM closes a channel, or when the opposite endpoint closes or rescinds the channel (through a call to the wrapper function). For the wrapper function, the input parameter (VmbChannel) indicates the channel to close.

In the virtual switch proxy, the wrapper function associated with VMSWITCH_VMNICPVT_KMCL_CHANNEL-SUSPEND corresponds to a target function associated with EVT_VMB_CHANNEL_SUSPEND in the channel client library. This target function is called at a server endpoint when the channel is being closed or deleted by a client endpoint, which moves the server into a stopped state. For the wrapper function, the input parameter (Channel) indicates the channel which is suspended.

In the virtual switch proxy, the wrapper function associated with VMSWITCH_VMNICPVT_KMCL_CHANNEL-STARTED corresponds to a target function associated with EVT_VMB_CHANNEL_STARTED in the channel client library. This target function is called at either endpoint when a channel is fully configured but before any packets have been delivered, which occurs when the opposite endpoint opened the channel or reopened it after closing it. For the wrapper function, the input parameter (Channel) indicates the channel which is started.

In the virtual switch proxy, the wrapper function associated with VMSWITCH_VMNICPVT_KMCL_PROCESS-PACKET corresponds to a target function associated with EVT_VMB_CHANNEL_PROCESS_PACKET in the channel client library. This target function is called (by a client endpoint of a guest VM, or by the virtual switch through the wrapper function of the virtual switch proxy) when a packet arrives in the incoming ring buffer. For the wrapper function, the input parameter Channel indicates the channel on which the packet arrives. The input parameter PacketCompletionContext indicates the completion context, which identifies this packet to the channel client library when the transaction can be retired. The input parameter PacketBuf indicates the packet (buffer) which was sent by the opposite endpoint. The input parameter BufSize indicates the length of the packet (buffer), in bytes. The input parameter Flags indicates various attributes of the packet.

In the virtual switch proxy, the wrapper function associated with VMSWITCH_VMNICPVT_KMCL_PACKETSENT corresponds to a target function associated with EVT_VMB_PACKET_COMPLETION_ROUTINE in the channel client library. This target function is called (by a client endpoint of a guest VM, or by the virtual switch through the wrapper function of the virtual switch proxy) when the transaction associated with a sent packet is complete. For the wrapper function, the input parameter PacketObject indicates the packet whose transaction is complete. The input parameter Status is a status code. The input parameter Buffer indicates a buffer that contains the completion response from an opposite endpoint, if any. The input parameter Length indicates the length of the buffer, in bytes.

In the virtual switch proxy, the wrapper function associated with VMSWITCH_VMNICPVT_KMCL_CHANNEL-SAVEPACKET corresponds to a target function associated with EVT_VMB_CHANNEL_SAVE_PACKET in the channel client library. This target function is called (by the virtual switch, as a network VSP endpoint, through the wrapper function of the virtual switch proxy) when the VSP endpoint must save the state associated with a packet. For the wrapper function, the input parameter VmbChannel indicates the channel on which the packet arrives. The input parameter Packet indicates the packet for which the VSP saves state. The output parameter SaveBuf indicates the buffer into which to save the state. The input parameter SaveBufSize indicates the length of the buffer, in bytes. The output parameter BytesNeeded indicates the size necessary to save the state of the transaction, in bytes.

In the virtual switch proxy, the wrapper function associated with VMSWITCH_VMNICPVT_KMCL_CHANNEL-RESTOREPACKET corresponds to a target function associated with EVT_VMB_CHANNEL_RESTORE_PACKET in the channel client library. This target function is called (by the virtual switch, as a network VSP endpoint, through the wrapper function of the virtual switch proxy) when the VSP endpoint must restore the state associated with a packet. For the wrapper function, the input parameter VmbChannel indicates the channel on which the packet arrives. The input parameter LibBuf is a pointer to a packet object state internal to the kernel mode client library. The input parameter LibBufSize indicates the length of the buffer LibBuf, in bytes. The input parameter SaveBuf is a pointer to a transaction state specific to the VSP, corresponding to the buffer into which the state was saved. The input parameter SaveBufSize indicates the length of the buffer SaveBuf, in bytes.

In the virtual switch proxy, the wrapper function associated with VMSWITCH_VMNICPVT_KMCL_PROCESS-INGCOMPLETE corresponds to a target function associated with EVT_VMB_CHANNEL_PROCESSING_COMPLETE in the channel client library. This target function is called (by a client endpoint of a guest VM, or by the virtual switch through the wrapper function of the virtual switch proxy) when a group of packets has been delivered by the target function for EVT_VMB_CHANNEL_PROCESS_ PACKET, if there is a pause before delivering subsequent packets. For the wrapper function, the input parameter Channel indicates the channel on which the packets are delivered. The input parameter PacketCount indicates the number of packets which were delivered in the batch.

Finally, the wrapper functions associated with VMSWITCH_VMPDPVT_KMCL_CHANNELOPENED and VMSWITCH_VMPDPVT_KMCL_CHANNEL-CLOSED in the virtual switch proxy correspond to target functions in the channel client library that are used to open or close a channel for packet direct ("PD") mode processing. Similarly, the wrapper functions associated with VMSWITCH_VMNICPVT_VERSION6HANDLE_RXPDBATCH and VMSWITCH_VMNICPVT_VERSION6HANDLE_TXPDBATCH in the virtual switch proxy correspond to target functions in the channel client library that are used to receive or transmit a batch of packets in PD mode processing.

The listing (605) in FIG. 6e shows a function table provided to the virtual switch proxy by the virtual switch when the virtual switch registers with the virtual switch proxy. Into the function table, the virtual switch puts function pointers to functions of the callback interface implemented by the virtual switch (see FIG. 6b) and function pointers to functions of the callback interface implemented by a channel client library (see FIGS. 6c and 6d). In its wrapper functions, the virtual switch proxy uses the function pointers to the functions of the callback interface implemented by the channel client library. This allows the function pointers to persist (stored in the virtual switch proxy) even if the virtual switch is unloaded from memory.

If a virtual switch is unloaded/reloaded during virtual switch servicing, a new table of function pointers (as shown in FIG. 6e) can be provided to the virtual switch proxy. The function pointers to the functions of the callback interface implemented by the virtual switch may have changed, although the function pointers to functions of the channel client library are still presumed to be valid.

The listing (606) of FIG. 6f shows function prototypes for functions of a callback interface implemented by the virtual switch proxy. When the virtual switch registers with the virtual switch proxy, the virtual switch proxy provides the function pointers, as part of the function table shown at the end of the listing (606), to the virtual switch (see FIGS. 6g and 6i). The virtual switch may then call one of the functions of the callback interface. Some of the functions implemented in the virtual switch proxy relate to registration or servicing (e.g., a function to unregister the virtual switch, a function to start servicing, and/or a function to check whether servicing is started). Other functions implemented in the virtual switch proxy relate to channel configuration (e.g., a function to allocate a channel, a function to clean up a channel, and/or a function to set channel callbacks). Such functions may be wrapper functions, which in turn call target functions for channel configuration implemented by another component.

In the callback interface implemented by the virtual switch proxy, the function associated with VMSPROXY_UNREGISTER is called by the virtual switch in order for the virtual switch to unregister from the virtual switch proxy. The input parameter is a pointer to a proxy context, which was returned as part of the output in the IOCTL request when the virtual switch is registered with the virtual switch proxy.

In the callback interface implemented by the virtual switch proxy, the function associated with VMSPROXY_IS_SERVICING_STARTED is called by the virtual switch to get the servicing state stored in the virtual switch proxy. The function returns a Boolean value—the servicing state.

In the callback interface implemented by the virtual switch proxy, the function associated with VMSPROXY_SET_IS_SERVICING_STARTED is called by the virtual switch to set the servicing state stored in the virtual state proxy. The input parameter is a Boolean value to which the servicing state is set.

In the callback interface implemented by the virtual switch proxy, the function associated with VMSPROXY_VMBCHANNEL_ALLOCATE is called by the virtual switch to allocate a channel (specifically, a VM bus channel). The input parameter ParentDeviceObject indicates a device object associated with the channel. The input parameter NicName indicates a network adapter associated with the channel, and the input parameter ChannelIndex indicates a channel index for the channel. The output parameter *Channel returns a data structure for the channel.

In the callback interface implemented by the virtual switch proxy, the function associated with VMSPROXY_VMBCHANNEL_CLEANUP_WHEN_NOT_SERVICING is called by the virtual switch to cleanup a channel. The input parameters NicName, ChannelIndex, and VmbChannel indicate the channel to clean up.

Finally, in the callback interface implemented by the virtual switch proxy, the function associated with VMSPROXY_SET_VMBCHANNEL_CALLBACKS is called by the virtual switch to register callbacks for the channel. The function can be used for both network buffer list ("NBL") and PD paths. The input parameter IsPD indicates whether the mode is NBL or PD. (The PacketDirect Provider Interface extends NDIS with an accelerated I/O model, for both physical and virtual environments, which can increase the number of packets processed per second and decrease jitter. The PD path can be used when an application prefers it and there are sufficient hardware resources to accommodate it.) The input parameter Channel indicates the channel, and the input parameters IsPrimaryChannel and IsReceiveChannel indicate attributes of the channel.

V. Example Operations to Configure a Virtual Networking Layer.

This section describes examples of operations performed to configure a virtual networking layer that includes a virtual switch registered with a virtual switch proxy (e.g., as in the configuration of FIG. 3a). This section also describes examples of operations performed to configure a virtual networking layer that includes a virtual switch registered with a virtual switch proxy and with a host network adapter proxy (e.g., as in the configuration of FIG. 3b or 4).

A. Configuring a Virtual Switch and Virtual Switch Proxy.

Figure 7A:
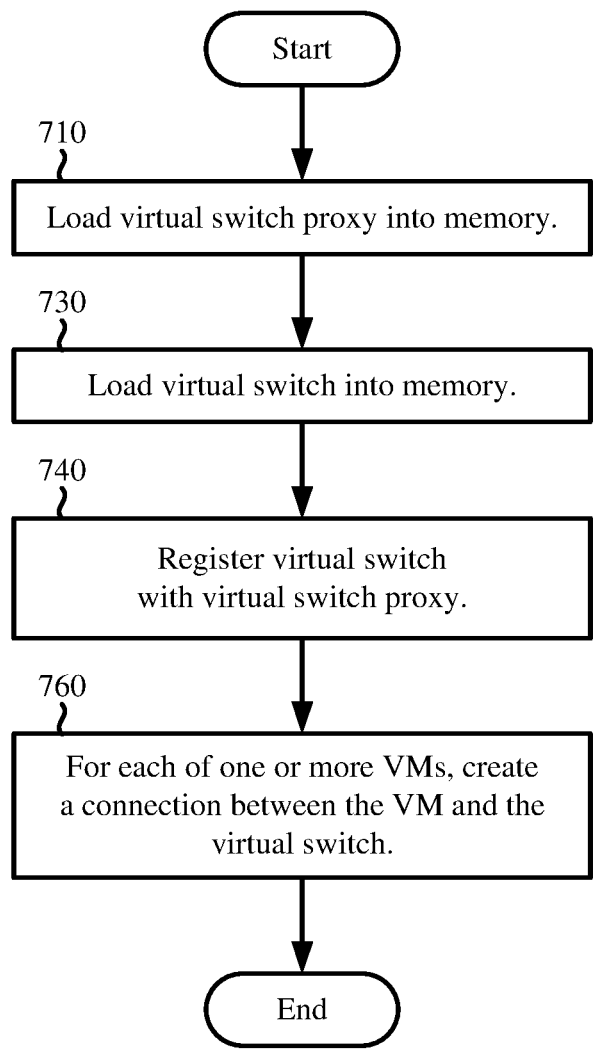
FIGS. 7a and 7b are flowcharts showing example techniques for configuring a network virtualization layer with a virtual switch and virtual switch proxy.

FIG. 7a shows an example technique (701) for configuring a network virtualization layer that includes a virtual switch and virtual switch proxy. One or more service managers as described with reference to FIG. 3a, or otherwise, can perform the technique (701). Some operations of the example technique (701) are performed during a boot process for the computer system. Other operations of the example technique (701) can be performed later, as VMs are added in guest partitions supported by the computer system.

One of the service managers loads (710) a virtual switch proxy into memory. For example, the virtual switch proxy can be loaded as a boot driver. The virtual switch proxy is registered as a virtual switch with the computer system. That is, the virtual switch proxy appears to be a virtual switch to the host and VMs.

One of the service managers also loads (730) a virtual switch into memory. For example, the virtual switch is loaded in the same process space as the virtual switch proxy. Then, one of the service managers registers (740) the virtual switch with the virtual switch proxy. For example, a service manager initiates an IOCTL call as shown in FIG. 6g. In this case, the virtual switch provides, to the virtual switch proxy, function pointers to a set of functions of a callback interface implemented by the virtual switch (see, e.g., FIGS. 6b, 6e, and 6h). The virtual switch also provides, to the virtual switch proxy, function pointers to a set of functions of a callback interface implemented by a channel client library (see, e.g., FIGS. 6c-6e and 6h). The virtual switch proxy provides, to the virtual switch, function pointers to a set of functions of a callback interface implemented by the virtual switch proxy (see, e.g., FIGS. 6f and 6i). Alternatively, the virtual switch can be registered with the virtual switch proxy in some other way, e.g., with different callback interfaces.

When the virtual switch is loaded and registered, a connection between the host and virtual switch, through the virtual switch proxy, can be automatically created. Or, one of the service managers can separately create a connection between the host and the virtual switch, through the virtual switch proxy. Either way, for example, a host virtual network adapter is created for the connection and bound to a network stack (e.g., protocol driver for TCP/IP) for the host. At this point, even though the virtual switch is loaded and registered, the virtual switch proxy still appears to be the virtual switch to the host and VMs.

Subsequently, for each of the VM(s), one of the service managers creates (760) a connection between the VM and the virtual switch, through the virtual switch proxy. For example, when a new instance of a VM starts, a virtual machine worker process ("VMWP") is started in the host partition for the VM. The VMWP starts a virtual motherboard and virtual BIOS for the VM. For a connection between the virtual switch and VM, the VMWP starts a network virtual service client ("VSC") in the guest partition. For example, the network VSC is a virtual NDIS miniport loaded as part of a driver. Function pointers to a set of functions of a callback interface implemented by the channel client library can be provided to the network VSC for the VM. The VMWP connects the network VSC to the virtual switch, through the virtual switch proxy, by creating a new VM network adapter, creating a new VM bus channel (for the VM), and connecting to the VM bus channel to the virtual switch. The channel operations can be requested with IOCTL commands to the virtual switch proxy, which forwards the IOCTL commands to the virtual switch. Alternatively, a connection between the virtual switch and a VM can be created in some other way. At this point, the virtual switch proxy still appears to be the virtual switch to components of the virtual networking layer (such as a host virtual network adapter for a host and VM network adapters for VM) and to clients of the virtual networking layer for the host and VMs.

B. Configuring a Virtual Switch, Virtual Switch Proxy, and Host Network Adapter Proxy.

Figure 7B:
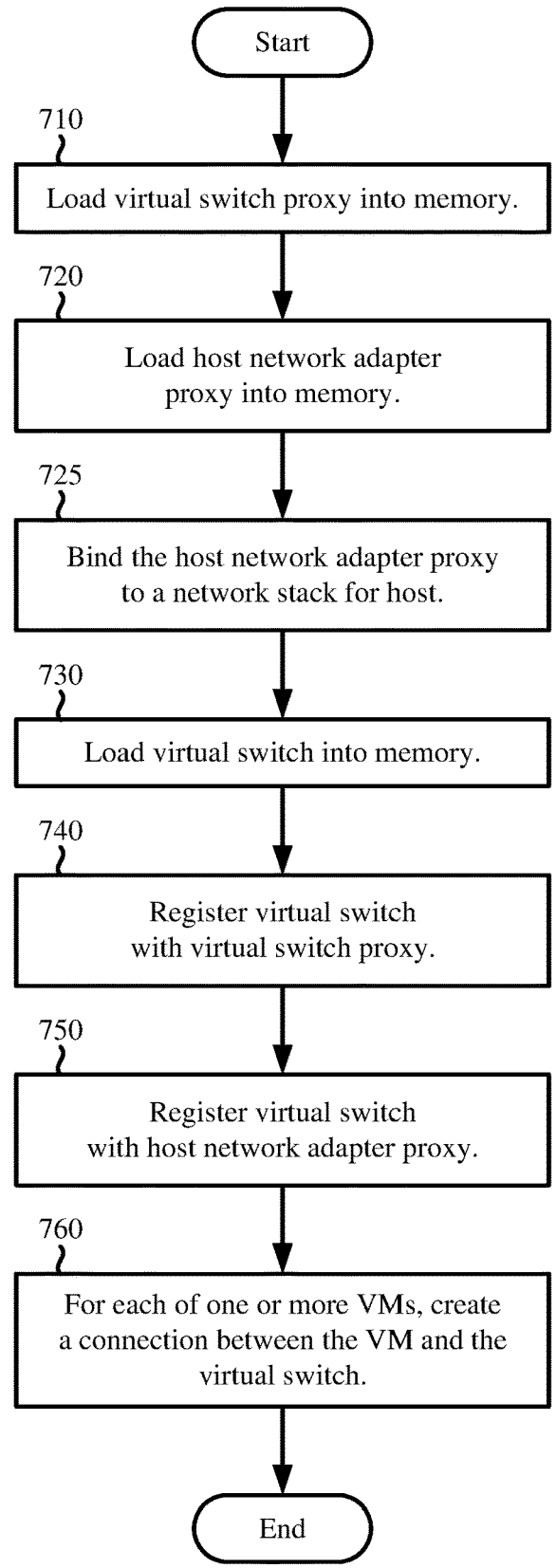

FIG. 7b shows an example technique (702) for configuring a network virtualization layer that includes a virtual switch, virtual switch proxy, and host network adapter proxy. One or more service managers as described with reference to FIG. 3b or 4, or otherwise, can perform the technique (702). Some operations of the example technique (702) are performed during a boot process for the computer system. Other operations of the example technique (702) can be performed later, as VMs are added in guest partitions supported by the computer system.

One of the service managers loads (710) a virtual switch proxy into memory, as described with reference to the example technique (701) of FIG. 7a.

One of the service managers also loads (715) a host network adapter proxy into memory. For example, the host network adapter proxy can be loaded as a boot driver. The host network adapter proxy is registered as a host physical network adapter driver (e.g., miniport driver) with the computer system. That is, the host network adapter proxy appears to be a host physical network adapter driver to the host.

One of the service managers binds (725) the host network adapter proxy to a network stack for the host. For example, the host network adapter proxy is bound to a protocol driver (e.g., for TCP/IP) in the host partition. The host network adapter proxy is a proxy for a host physical network adapter driver, which implements a set of target functions to configure and control a host physical network adapter.

One of the service managers loads (730) a virtual switch into memory and registers (740) the virtual switch with the virtual switch proxy, as described with reference to the example technique (701) of FIG. 7a.

One of the service managers registers (735) the virtual switch with the host network adapter proxy. For example, a service manager initiates an IOCTL call as shown in FIG. 5a. In this case, the host network adapter proxy provides, to the virtual switch, function pointers to a set of control functions of a callback interface implemented by the host network adapter proxy (see, e.g., FIGS. 5b, 5c, and 5e). The host network adapter proxy also provides, to the virtual switch, function pointers to a set of wrapper functions of a callback interface implemented by the host network adapter proxy (see, e.g., FIGS. 5b, 5c, and 5e). The wrapper functions wrap the target functions implemented by the host physical network adapter driver. Alternatively, the virtual switch can be registered with the host network adapter proxy in some other way, e.g., with a different callback interface.

As shown in FIGS. 3b and 4, in some configurations, a host virtual network adapter (for a host physical network adapter) is implemented as part of the virtual switch. When the virtual switch is loaded and registered with the host network adapter proxy, a connection between the host and virtual switch, through the host network adapter proxy, is automatically created. Alternatively, the host virtual network adapter (for the host physical network adapter) can be implemented apart from the virtual switch. At this point, even though the virtual switch is loaded and registered, the host network adapter proxy still appears to be the host physical network adapter to the host, and the virtual switch proxy still appears to be the virtual switch to VMs.

Subsequently, for each of the VM(s), one of the service managers creates (760) a connection between the VM and the virtual switch, through the virtual switch proxy, as described with reference to the example technique (701) of FIG. 7a.

VI. Example Operations to Service a Virtual Switch.

This section describes examples of operations performed to service a virtual switch that is registered with a virtual switch proxy. This section also describes examples of operations performed to service a virtual switch that is registered with a virtual switch proxy and with a host network adapter proxy. In some example implementations, the process of servicing a virtual switch (including swapping versions of the virtual switch) takes less time than the "time out" period for a network connection (e.g., 9 or 10 seconds). As such, to a host or VM, the servicing of the virtual switch can appear to be a temporary disruption in network delivery.

In general, the process of virtual switch servicing saves certain state information for connections to host and VM components from the virtual switch, disconnects the virtual switch from the underlying host physical network adapter, unloads the previous version of the virtual switch, loads the current version of the virtual switch, reconnects the virtual switch to the underlying host physical network adapter, and restores the connections to host and VM components using the saved state information. Throughout the virtual switch servicing process, the virtual switch proxy and channel client library remain loaded in memory. Function pointers to functions implemented by the virtual service proxy and function pointers to functions implemented by the channel client library remain valid. If a host network adapter proxy is used, the host network adapter proxy also remains loaded in memory throughout the virtual switch servicing process. Function pointers to functions implemented by the host network adapter proxy remain valid. In this way, to the host and VMs, apparent connectivity to the virtual switch (and any network accessible through the virtual switch) is maintained during virtual switch servicing, even when actual network connectivity is briefly interrupted.

A. Servicing a Virtual Switch Registered with a Virtual Switch Proxy.

Figure 8A:
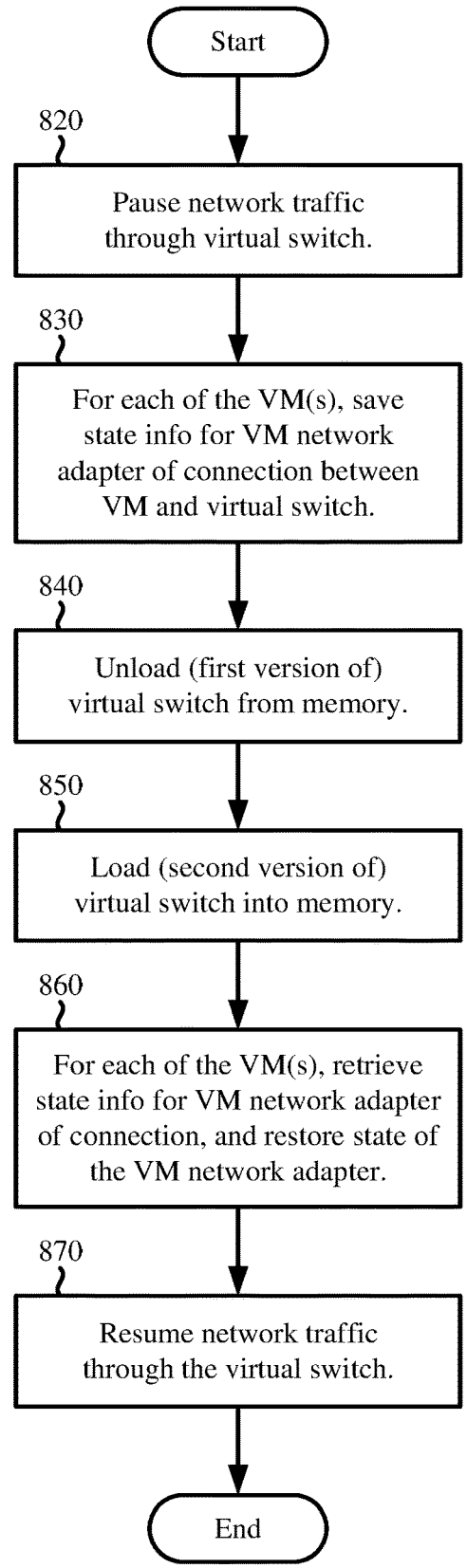
FIGS. 8a and 8b are flowcharts showing example techniques for servicing a virtual switch.

FIG. 8a shows an example technique (801) for servicing a virtual switch in a network virtualization layer that includes a virtual switch and a virtual switch proxy. An orchestration agent as described with reference to FIG. 3a, or otherwise, can perform the technique (801).

To start, the orchestration agent pauses (820) network traffic through the virtual switch. For example, the orchestration agent temporarily stops network traffic on the data path for the host and on data paths for VMs, while preserving the operational state of the networking interface. In some example implementations, the VM bus channel for a VM is suspended. This operation freezes the flow of data, but keeps existing network connections and sockets open. If the orchestration agent calls a function per VM bus channel to suspend the channel and thereby pause network traffic on that channel, the network traffic can be queued, buffered, etc. in the channel until the flow of network traffic resumes.

For each of the VM(s), the orchestration agent saves (830) state information for a VM network adapter of a connection between the VM and the virtual switch. For example, for each of the VM(s), the state information for the VM network adapter of the connection between the VM and the virtual switch is saved to memory accessible to the virtual switch proxy, while the VM is still running. In the configuration shown in FIG. 3a, the orchestration agent can also save state information for a host virtual network adapter of a connection between the host and virtual switch. For example, the state information for the host virtual network adapter is saved to memory accessible to the virtual switch proxy. Alternatively, the orchestration agent saves other and/or additional state information for connections from the virtual switch to the host and/or VMs.

When the virtual switch has been bound to an underlying host physical network adapter (e.g., the virtual switch is not a private switch or internal switch), the orchestration agent unbinds the virtual switch from the host physical network adapter. This disconnects the virtual switch from the host physical network adapter and any drivers for the host physical network adapter (e.g., any host network adapter driver between the virtual switch and host physical network adapter). Before unbinding, the orchestration agent can save state information for the host physical network adapter (e.g., host physical network adapter driver).

In some example implementations, the virtual switch uses extensions (e.g., for filtering, monitoring, capturing). The orchestration agent can save state information for components (e.g., virtual network adapters) used to implement those extensions.

At this point, references to the virtual switch are gone, and the virtual switch can be unloaded from memory. The orchestration agent unloads (840) a first version (i.e., previous version) of the virtual switch from memory, without interrupting apparent connectivity for the host and VM(s) (over their respective connections to the virtual switch). The host and VMs are still connected to the virtual switch proxy, which is registered as a virtual switch in the computer system. Function pointers to the functions of a callback interface implemented by the virtual switch proxy are maintained. As such, the host and VMs may be unaware that the virtual switch has been unloaded. To the host and VMs, apparent connectivity over their respective connections to the virtual switch (and any network accessible through the virtual switch) is maintained.

The orchestration agent loads (850) a second version of the virtual switch into memory. For example, after unloading the previous version of the virtual switch, the orchestration agent immediately loads the current version of the virtual switch into memory, as a binary.

For each of the VM(s), the orchestration agent retrieves (860) the state information for the VM network adapter of the connection between the VM and the virtual switch, and restores state of the VM network adapter. For example, the orchestration agent recovers VM network adapter information from memory accessible to the virtual switch proxy, while the VM is running, and restores state of the VM network adapter. At this point, connections from the virtual switch to the VMs are restored. In the configuration shown in FIG. 3a, the orchestration agent can also retrieve state information for the host virtual network adapter of the connection between the host and virtual switch, and restore state of the host virtual network adapter. For example, the orchestration agent recovers host virtual network adapter information from memory accessible to the virtual switch proxy, while the host is running, and restores state of the host virtual network adapter. Alternatively, the orchestration agent retrieves other and/or additional state information, and uses that retrieved state information to restore connections from the virtual switch to the host and/or VMs.

The orchestration agent resumes (870) network traffic through the virtual switch. For example, the orchestration agent unfreezes network traffic on the data path for the host and on the data paths for VMs. In some example implementations, the VM bus channel for a VM is started. If the orchestration agent calls a function per VM bus channel to start the channel and thereby resume network traffic on that channel, network traffic that has been queued, buffered, etc. in the channel can be delivered.

When the virtual switch is to be bound to an underlying host physical network adapter (e.g., the virtual switch is not a private switch or internal switch), the orchestration agent binds the virtual switch to the host physical network adapter. Before binding, the orchestration agent can retrieve state information for the host physical network adapter (e.g., host physical network adapter driver), and use the retrieved state information to restore state of the host physical network adapter (e.g., host physical network adapter driver). This reconnects the virtual switch to the host physical network adapter and any drivers for the host physical network adapter (e.g., any host network adapter driver between the virtual switch and host physical network adapter).

If the virtual switch uses extensions (e.g., for filtering, monitoring, capturing), the orchestration agent can re-enable the extensions, retrieve saved state information for components (e.g., virtual network adapters) used to implement those extensions, and restore state for the components (e.g., virtual network adapters) using the retrieved state information.

At this point, the network connection is operational. Host network adapter connectivity and VM network adapter connectivity have been fully restored, with an updated virtual switch running.

B. Servicing a Virtual Switch Registered with a Virtual Switch Proxy and Host Network Adapter Proxy.

Figure 8B:
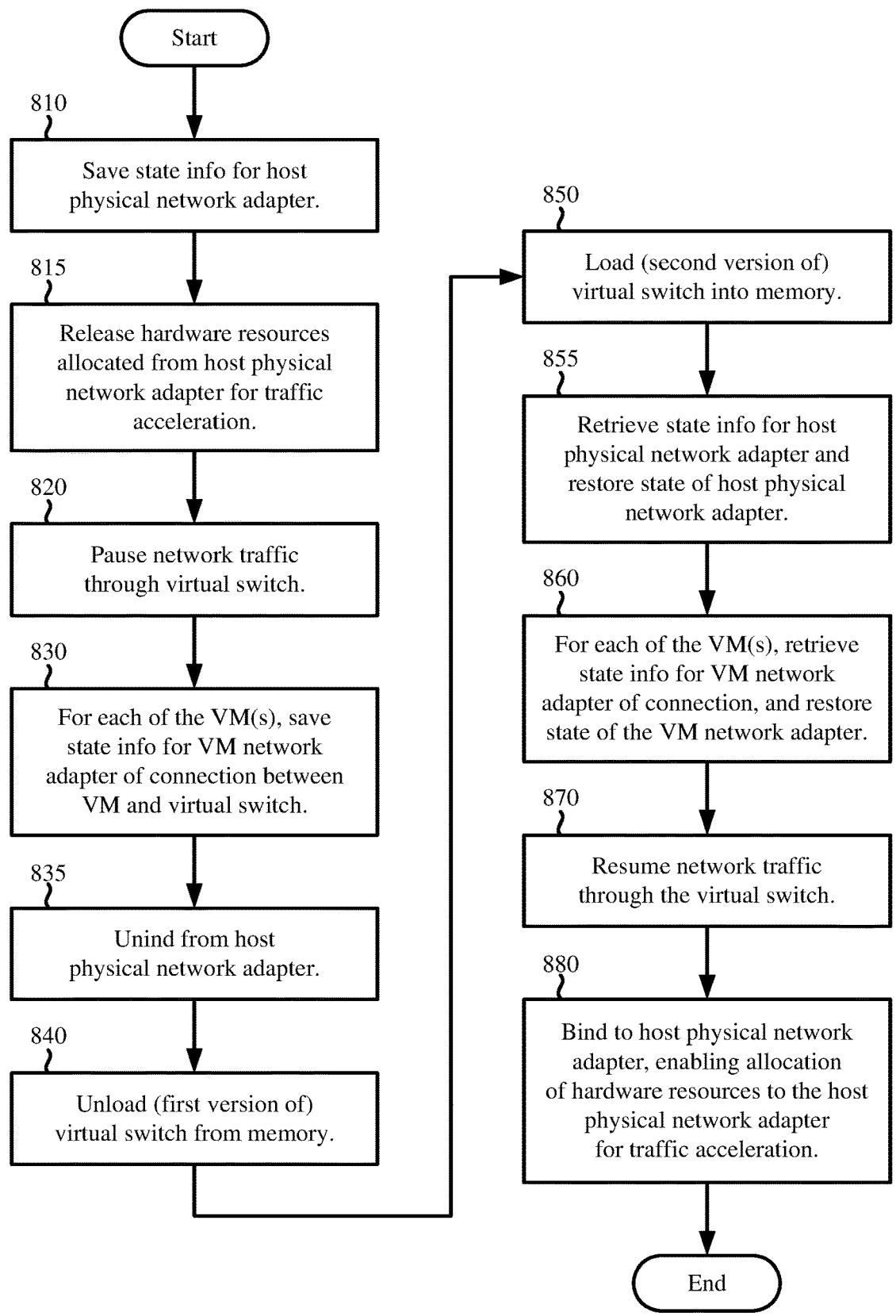

FIG. 8b shows an example technique (802) for servicing a virtual switch in a network virtualization layer that includes a virtual switch, virtual switch proxy, and host network adapter proxy. An orchestration agent as described with reference to FIG. 3b or 4, or otherwise, can perform the technique (802).

To start, the orchestration agent saves (810) state information for a host physical network adapter. For example, the orchestration agent saves configuration information for the host physical network adapter (e.g., for a host physical network adapter driver) in memory accessible to the host network adapter proxy.

In order for the virtual switch to unbind from the host physical network adapter, the orchestration agent releases (815) any hardware resources allocated from the host physical network adapter for traffic acceleration. For example, the orchestration agent disables features of hardware-assisted acceleration (such as vPort and virtual machine queues), which releases resources allocated from the host physical network adapter for traffic acceleration. Disabling hardware-assisted acceleration causes a network "brown out"—network traffic still flows, but less efficiently than when hardware-assisted acceleration is enabled. The host physical network adapter remains connected to the virtual switch and operational at this point. (Although hardware-assisted acceleration is disabled before a virtual switch is swapped, disabling hardware-assisted acceleration takes time, which has nothing per se to do with the virtual switch swap. In some example implementations, disabling hardware-assisted acceleration can take approximately 7 seconds. Network traffic still moves, however, so the delay for this stage does not count as a network failure.)

The orchestration agent pauses (820) network traffic through the virtual switch and, for each of the VM(s), saves (830) state information for a VM network adapter of a connection between the VM and the virtual switch, as described with reference to the example technique (801) of FIG. 8a. The orchestration agent can also save state information for a host virtual network adapter of a connection between the host and virtual switch. For example, the state information for the host virtual network adapter is saved to memory accessible to the host network adapter proxy. Alternatively, the orchestration agent saves other and/or additional state information for connections from the virtual switch to the host and/or VMs.

In some example implementations, the virtual switch uses extensions (e.g., for filtering, monitoring, capturing). The orchestration agent can save state information for components (e.g., virtual network adapters) used to implement those extensions.

The orchestration agent unbinds (835) the virtual switch from the host physical network adapter. This disconnects the virtual switch from the host physical network adapter and any drivers for the host physical network adapter (e.g., any host network adapter driver between the virtual switch and host physical network adapter).

At this point, references to the virtual switch are gone, and the virtual switch can be unloaded from memory. The orchestration agent unloads (840) a first version (i.e., previous version) of the virtual switch from memory, without interrupting apparent connectivity for the host and VM(s) (over their respective connections to the virtual switch). The host is still connected to the host network adapter proxy, which is registered as a host physical network adapter driver in the computer system. The VMs are still connected to the virtual switch proxy, which is registered as a virtual switch in the computer system. Function pointers to the functions of callback interfaces implemented by the host network adapter proxy and virtual switch proxy are maintained. As such, the host and VMs may be unaware that the virtual switch has been unloaded. To the host and VMs, apparent connectivity over their respective connections to the virtual switch (and any network accessible through the virtual switch) is maintained.

The orchestration agent loads (850) a second version of the virtual switch into memory, as described with reference to the example technique (801) of FIG. 8a.

The orchestration agent retrieves (855) the state information for the host physical network adapter and restores the state of the host physical network adapter. For example, the orchestration agent retrieves configuration information for the host physical network adapter (e.g., for a host physical network adapter driver) from memory accessible to the host network adapter proxy, and restores state of the host physical network adapter (e.g., the host physical network adapter driver). In this way, the orchestration agent can connect to the host network adapter proxy, discover existing instances of host physical network adapter drivers (e.g., for NIC miniport instances), read previously-stored network-adapter-related state information from the host network adapter proxy, and restore the state of a host physical network adapter driver (e.g., for a NIC miniport instance) accordingly. Alternatively, the orchestration agent retrieves other and/or additional state information from the host network adapter proxy, and uses that retrieved state information to restore the connection from the virtual switch to the host and/or host physical network adapter.

For each of the VM(s), the orchestration agent retrieves (860) the state information for the VM network adapter of the connection between the VM and the virtual switch, and restores state of the VM network adapter, as described with reference to the example technique (801) of FIG. 8a. At this point, connections from the virtual switch to the VMs are restored. The orchestration agent can also retrieve state information for the host virtual network adapter of the connection between the host and virtual switch, and restore state of the host virtual network adapter. For example, the orchestration agent recovers host virtual network adapter information from memory accessible to the host network adapter proxy, while the host is running, and restores state of the host virtual network adapter. Alternatively, the orchestration agent retrieves other and/or additional state information from the virtual switch proxy or host network adapter proxy, and uses that retrieved state information to restore connections from the virtual switch to the host and/or VMs.

The orchestration agent resumes (870) network traffic through the virtual switch, as described with reference to the example technique (801) of FIG. 8a.

If the virtual switch uses extensions (e.g., for filtering, monitoring, capturing), the orchestration agent can re-enable the extensions, retrieve saved state information for components (e.g., virtual network adapters) used to implement those extensions, and restore state for the components (e.g., virtual network adapters) using the retrieved state information.

The orchestration agent binds (880) the virtual switch to the host physical network adapter. This reconnects the virtual switch to the host physical network adapter and any drivers for the host physical network adapter (e.g., any host network adapter driver between the virtual switch and host physical network adapter). Binding the virtual switch to the host physical network adapter enables allocation of hardware resources from the host physical network adapter for traffic acceleration. For example, the binding process enables features of hardware-assisted acceleration (such as vPort and virtual machine queues), which can help optimize traffic flow through the host physical network adapter and VM network adapters. Hardware-assisted acceleration can be negotiated between the virtual switch and host physical network adapter.

At this point, the network connection is operational. Host network adapter connectivity and VM network adapter connectivity have been fully restored, with an updated virtual switch running.

C. Other Alternatives and Variations.

In the preceding example techniques (801, 802), state information about VM network adapters is saved and used to restore state of the VM network adapters. Alternatively, during virtual switch servicing, other and/or additional information can be saved and used to restore state for connections between the virtual switch and VMs. For example, at least some state information for a channel (e.g., configuration information for a VM bus channel) for a connection can be saved by the virtual switch proxy. In some example implementations, the virtual switch proxy implements automatic saving of such channel state information, since calls to configure, control, etc. a channel are handled through the virtual switch proxy. Thus, the virtual switch proxy can save channel state information during an initial configuration stage, before the servicing of the virtual switch starts. When the virtual switch calls the virtual switch proxy function to allocate a channel, the virtual switch proxy can save state information about the channel. Alternatively, such channel state information can be saved as part of the virtual switch servicing. Regardless of when state information about the channel is saved, the orchestration agent can retrieve the saved information and restore the state of the channel after the virtual switch is reloaded.

In the second preceding example technique (802), state information about a host physical network adapter is saved and used to restore state of the host physical network adapter. Alternatively, during virtual switch servicing, other and/or additional information can be saved and used to restore state for the connection between the virtual switch and host. For example, at least some state information for a host virtual network adapter for a connection can be saved by the host network adapter proxy or virtual switch proxy. In some example implementations, the host network adapter proxy implements automatic saving of such host virtual network adapter state information, since NDIS calls to the host physical network adapter driver are handled through the host network adapter proxy. Thus, the host network adapter proxy can save host virtual network adapter state information during an initial configuration stage, before the servicing of the virtual switch starts. When the virtual switch registers with the host network adapter proxy or sets attributes of the host physical network adapter, the host network adapter proxy can save state information about the host virtual network adapter. Alternatively, such host virtual network adapter state information can be saved as part of the virtual switch servicing. Regardless of when state information about the host virtual network adapter is saved, the orchestration agent can retrieve the saved information and restore the state of the host virtual network adapter after the virtual switch is reloaded.

In the preceding examples, state information is saved in memory accessible to the virtual switch proxy and/or saved in memory accessible to the host network adapter proxy, if present. Alternatively, state information can be saved in persistent storage.

In some example implementations, before saving state information to the virtual switch proxy and/or host network adapter proxy, and before pausing network traffic through the virtual switch, the orchestration agent sets a state indicator to indicate the start of servicing operations (and that the virtual switch is not operating in a normal state). For example, the orchestration agent sends an IOCTL command to the virtual switch, which (through a call to a function of a callback interface implemented by the virtual switch proxy) sets a flag in the virtual switch proxy to indicate servicing operations have started. Subsequently, after restoring state of connections to the host and VMs, and after resuming network traffic through the virtual switch, the orchestration agent sets the state indicator to indicate completion of the servicing operations (and that the virtual switch is operating in a normal state). For example, the orchestration agent sends an IOCTL command to the virtual switch, which (through a call to a function of a callback interface implemented by the virtual switch proxy), sets the flag in the virtual switch proxy to indicate servicing operations have completed. Binding of the virtual switch to an underlying host physical network adapter (and hence hardware-assisted acceleration) can be contingent on the state indicator indicating that servicing operations have completed (and that the virtual switch is operating in a normal state). Thus, the state indicator can be checked, as a condition, before binding happens. For example, the virtual switch can call a function of a callback interface implemented by the virtual switch proxy to check the state indicator.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising one or more processing units and memory, the computer system providing a virtual networking layer, the virtual networking layer comprising:
 a virtual switch configured to transfer data between multiple ports of the virtual switch; and
 a virtual switch proxy configured to, for each of one or more virtual machines ("VMs"):
  mediate transfers of data over a connection, through a VM network adapter, between the VM and the virtual switch; and
  when changing versions of the virtual switch, persist state information that defines features of the connection through the VM network adapter, thereby facilitating maintenance of apparent connectivity for the VM over the connection through the VM network adapter.

2. The computer system of claim 1, wherein, to persist the state information that defines features of the connection through the VM network adapter, the virtual switch proxy is configured to:
 save and retrieve state information for the VM network adapter of the connection; and/or
 save and retrieve state information for a channel between the virtual switch and the VM.

3. The computer system of claim 1, wherein the virtual networking layer further includes a host network adapter proxy configured to, for a host connected to the virtual networking layer:
 mediate transfers of data over a connection, through a host virtual network adapter, between the host and the virtual switch; and
 when changing the versions of the virtual switch, persist state information that defines features of the connection through the host virtual network adapter, thereby facilitating maintenance of apparent connectivity for the host over the connection through the host virtual network adapter.

4. The computer system of claim 3, wherein, to persist the state information that defines features of the connection through the host virtual network adapter, the host network adapter proxy is configured to:
 save and retrieve state information for the host virtual network adapter of the connection; and/or
 save and retrieve state information for a host physical network adapter.

5. The computer system of claim 1, wherein the virtual switch proxy is further configured to, for a host connected to the virtual networking layer:
- mediate transfers of data over a connection, through a host virtual network adapter, between the host and the virtual switch; and
- when changing the versions of the virtual switch, persist state information that defines features of the connection through the host virtual network adapter, thereby facilitating maintenance of apparent connectivity for the host over the connection through the host virtual network adapter.

6. The computer system of claim 1, wherein the computer system further provides one or more service managers configured to perform operations to configure the virtual networking layer, the operations to configure the virtual networking layer including:
- loading the virtual switch proxy into memory;
- loading the virtual switch into memory,
- registering the virtual switch with the virtual switch proxy; and
- for each of the one or more VMs, creating the connection between the VM and the virtual switch.

7. The computer system of claim 6, wherein the operations to configure the virtual networking layer further include:
- loading a host network adapter proxy into memory; and
- registering the virtual switch with the host network adapter proxy.

8. The computer system of claim 1, wherein the computer system further provides an orchestration agent configured to perform operations to service the virtual switch, the operations to service the virtual switch including:
- pausing network traffic through the virtual switch;
- for each of the one or more VMs, saving state information for the VM network adapter of the connection between the VM and the virtual switch;
- unloading a first one of the versions of the virtual switch from memory;
- loading a second one of the versions of the virtual switch into memory;
- for each of the one or more VMs, retrieving the state information for the VM network adapter of the connection between the VM and the virtual switch, and restoring state of the VM network adapter; and
- resuming network traffic through the virtual switch.

9. The computer system of claim 8, wherein the operations to service the virtual switch further include:
- saving state information for a host physical network adapter;
- releasing hardware resources allocated from the host physical network adapter for traffic acceleration;
- retrieving the state information for the host physical network adapter and restoring state of the host physical network adapter; and
- binding to the host physical network adapter, thereby enabling allocation of hardware resources from the host physical network adapter for traffic acceleration.

10. The computer system of claim 1, wherein, to mediate transfers of data over the connection, the virtual switch proxy is configured to call target functions implemented by a channel client library, wherein wrapper functions for the target functions are defined in the virtual switch proxy, the function pointers to the target functions implemented by the channel client library being persisted when changing the versions of the virtual switch.

11. The computer system of claim 1, wherein the virtual switch proxy implements one or more of:
- a function to unregister the virtual switch from the virtual switch proxy;
- a function to set a servicing state for the virtual switch;
- a function to get the servicing state for the virtual switch;
- a function to request channel allocation;
- a function to request channel clean up; and
- a function to provide channel callbacks.

12. The computer system of claim 1, wherein, for a device associated with a host physical network adapter, the virtual switch implements one or more of:
- a function to request handler creation;
- a function to request handler closing;
- a function to request a read operation;
- a function to request a write operation; and
- a function to request an internal device control operation.

13. The computer system of claim 1, wherein the virtual switch and virtual switch proxy execute in a host partition, and wherein, for each of the one more VMs:
- the VM executes in a different guest partition; and
- the connection between the VM and the virtual switch uses a channel between the virtual switch and the VM.

14. In a computer system that provides a virtual networking layer, a method of servicing a virtual switch, the method comprising:
- pausing network traffic through the virtual switch;
- for each of one or more virtual machines ("VMs"), saving state information for a VM network adapter of a connection between the VM and the virtual switch;
- unloading a first version of the virtual switch from memory, without interrupting apparent connectivity for the one or more VMs;
- loading a second version of the virtual switch into memory;
- for each of the one or more VMs, retrieving the state information for the VM network adapter of the connection between the VM and the virtual switch, and restoring state of the VM network adapter; and
- resuming network traffic through the virtual switch.

15. The method of claim 14, further comprising:
- before the pausing network traffic through the virtual switch, saving state information for a host physical network adapter, and releasing any hardware resources allocated from the host physical network adapter for traffic acceleration;
- after the loading the second version of the virtual switch into memory, retrieving the state information for the host physical network adapter and restoring state of the host physical network adapter; and
- after the resuming network traffic through the virtual switch, binding to the host physical network adapter, thereby enabling allocation of hardware resources from the host physical network adapter for traffic acceleration.

16. The method of claim 15, further comprising:
- before the saving the state information for the host physical network adapter, setting a state indicator to indicate start of servicing operations; and
- after the resuming network traffic through the virtual switch, setting the state indicator to indicate completion of the servicing operations, wherein the binding to the host physical network adapter is contingent on the completion of the servicing operations.

17. The method of claim 15, wherein:
- for each of the one or more VMs, the state information for the VM network adapter of the connection is saved to and retrieved from memory accessible to a virtual switch proxy; and
- the state information for the host physical network adapter is saved to and retrieved from memory accessible to a host network adapter proxy or memory accessible to the virtual switch proxy.

18. The method of claim 14, wherein, before the servicing of the virtual switch starts:
- at least some state information for a host virtual network adapter is saved; and
- at least some state information for a channel for the connection is saved.

19. One or more computer-readable media having stored therein computer-executable instructions for causing a computer system, when programmed thereby, to perform operations to configure a virtual networking layer, the operations comprising:
- loading a virtual switch proxy into memory;
- loading a virtual switch into memory;
- registering the virtual switch with the virtual switch proxy; and
- for each of one or more virtual machines ("VMs"), creating a connection between the VM and the virtual switch.

20. The one or more computer-readable media of claim 19, wherein the operations further comprise:
- loading a host network adapter proxy into memory; and
- registering the virtual switch with the host network adapter proxy.

* * * * *